United States Patent
Cozza et al.

(10) Patent No.: US 8,967,592 B2
(45) Date of Patent: Mar. 3, 2015

(54) LIFTING SYSTEM FOR DISPLAY CASES

(71) Applicants: Frank Charles Cozza, Santee, CA (US); Gerry Taylor, Carlsbad, CA (US)

(72) Inventors: Frank Charles Cozza, Santee, CA (US); Gerry Taylor, Carlsbad, CA (US)

( * ) Notice: Subject to any disclaimer, the term of this patent is extended or adjusted under 35 U.S.C. 154(b) by 223 days.

(21) Appl. No.: 13/685,644

(22) Filed: Nov. 26, 2012

(65) Prior Publication Data

US 2014/0145131 A1 May 29, 2014

Related U.S. Application Data

(63) Continuation-in-part of application No. 11/704,474, filed on Feb. 8, 2007, now Pat. No. 8,317,451.

(60) Provisional application No. 60/771,985, filed on Feb. 9, 2006, provisional application No. 61/653,409, filed on May 31, 2012.

(51) Int. Cl.
| | |
|---|---|
| *B66F 5/04* | (2006.01) |
| *B66F 5/00* | (2006.01) |
| *B62B 1/00* | (2006.01) |
| *B62B 5/00* | (2006.01) |
| *B62B 1/06* | (2006.01) |
| *B62B 1/04* | (2006.01) |

(52) U.S. Cl.
CPC ... *B62B 1/06* (2013.01); *B62B 1/04* (2013.01); *B62B 5/0089* (2013.01); *B62B 5/0083* (2013.01)

USPC ......... 254/2 R; 254/7 R; 280/79.7; 280/79.11

(58) Field of Classification Search
CPC .................................. B62B 1/00; B62B 5/00
USPC ............ 254/2 R, 10 R, 10 B, 7 R, 93 H, 134; 280/79.7, 79.11; 414/373
See application file for complete search history.

(56) References Cited

U.S. PATENT DOCUMENTS

| 4,516,901 | A | * | 5/1985 | Riedl | 414/458 |
|---|---|---|---|---|---|
| 5,249,908 | A | * | 10/1993 | Tsai | 414/446 |
| 5,927,731 | A | * | 7/1999 | Clarke | 280/79.7 |
| 8,596,613 | B2 | * | 12/2013 | Arensdorf et al. | 254/93 H |
| 2003/0215314 | A1 | * | 11/2003 | Klokke | 414/495 |
| 2007/0059138 | A1 | * | 3/2007 | Cozza | 414/490 |
| 2008/0107511 | A1 | * | 5/2008 | Oberg | 254/131 |
| 2012/0126189 | A1 | * | 5/2012 | Cozza et al. | 254/2 R |

* cited by examiner

*Primary Examiner* — Lee D Wilson
*Assistant Examiner* — Seahee Yoon
(74) *Attorney, Agent, or Firm* — Donn K. Harms

(57) ABSTRACT

A lifting system for shelves and store gondolas which provides for a deflective contact engagement of the upright posts of the frame of the shelving which supports the load on engaged shelves and products. The device features a dolly and extending members having an opening on distal ends to contact the post in a removable engagement. Tapers on the members provide for deflection of any kickplates blocking the members from engagement to the posts. The dollies may be employed in a plurality around the shelf and engaged with connector bars between them for a unified movement of the dollies elevating the shelf.

20 Claims, 25 Drawing Sheets

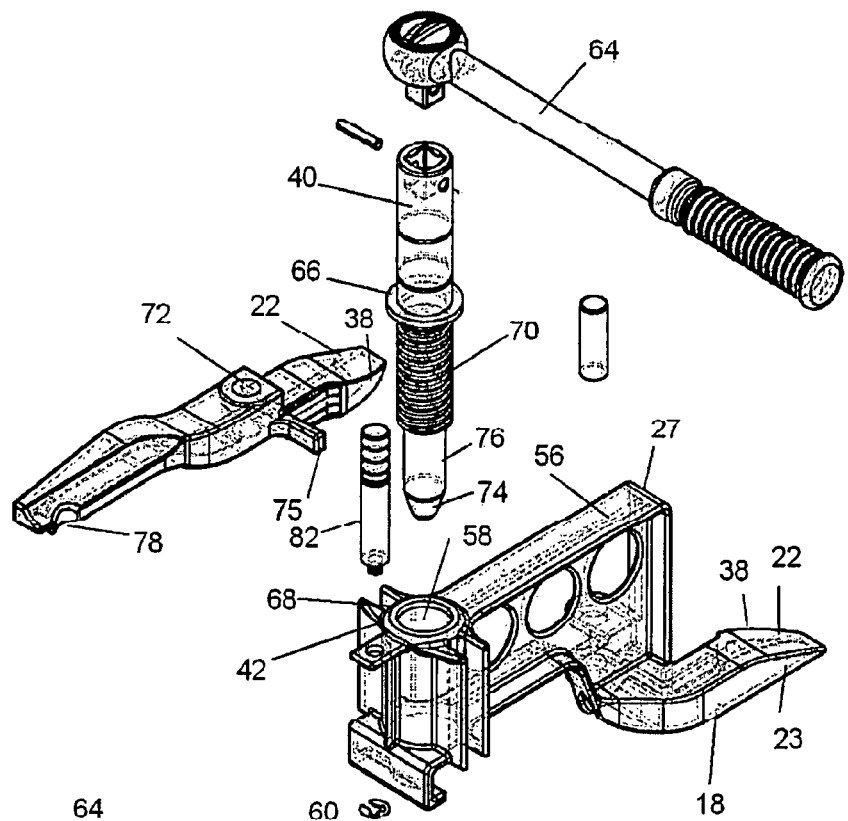
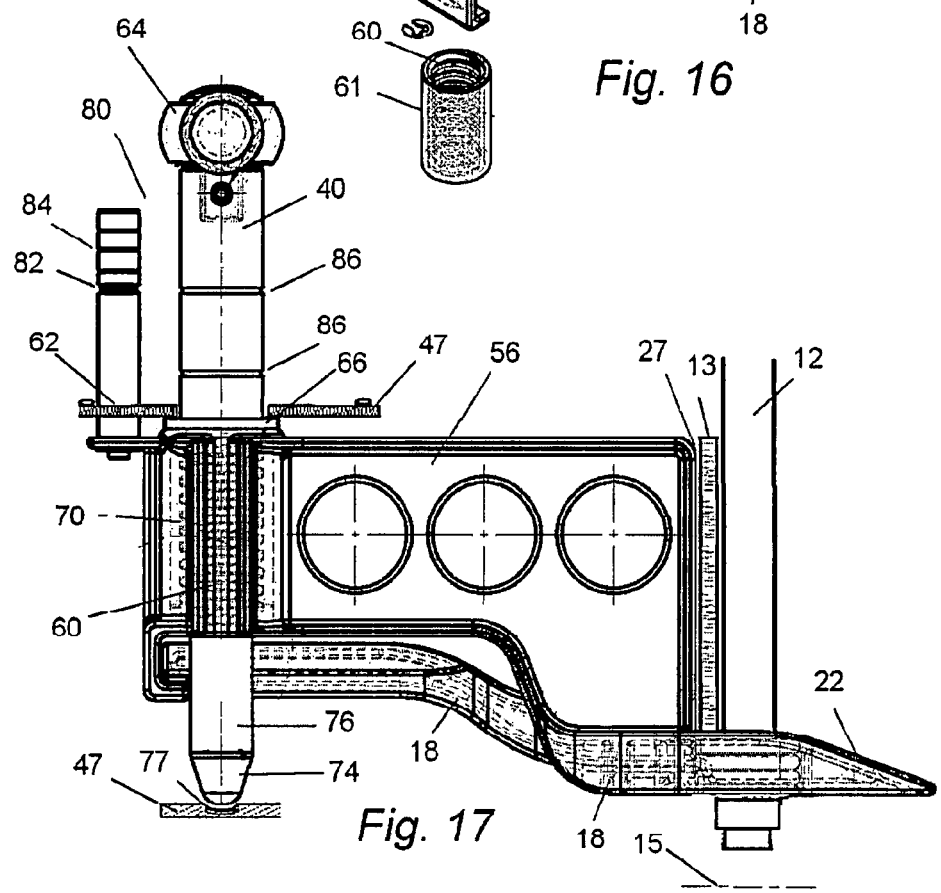
Fig. 16
Fig. 17

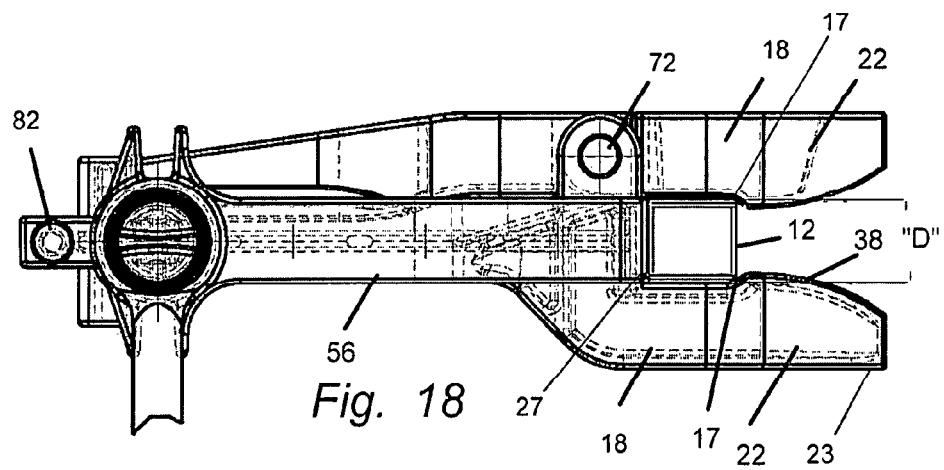
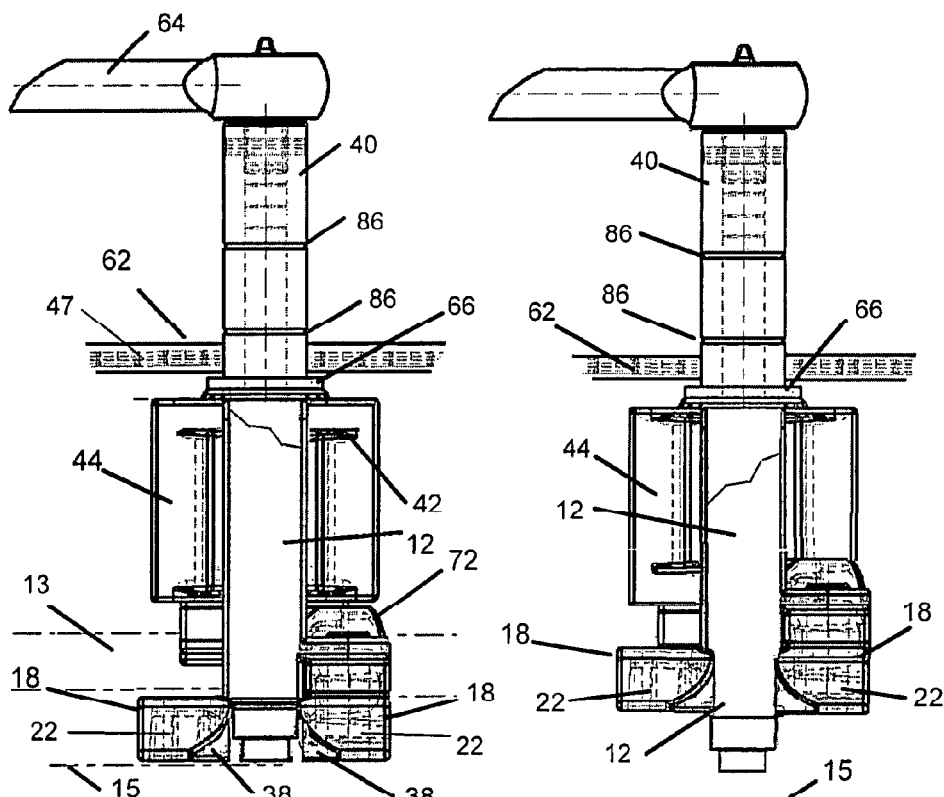
Fig. 18
Fig. 19
Fig. 20

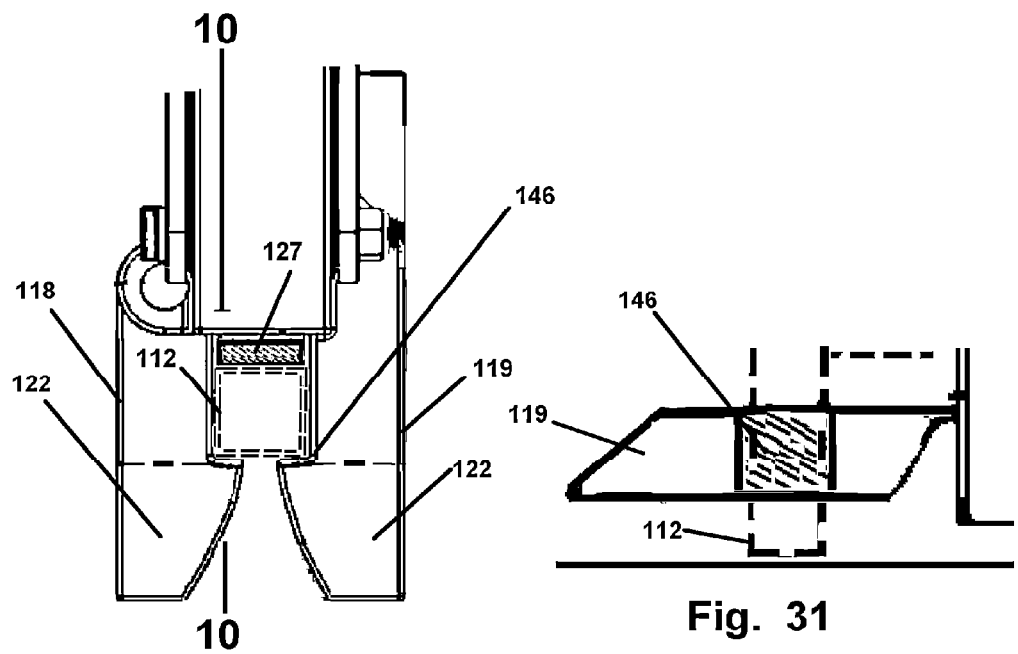
Fig. 30
Fig. 31
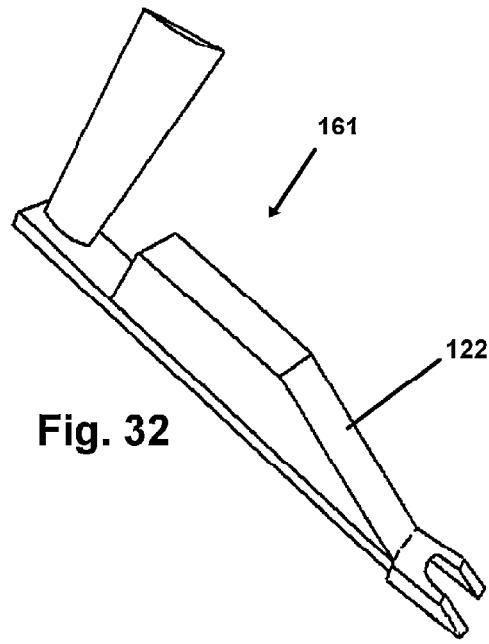
Fig. 32

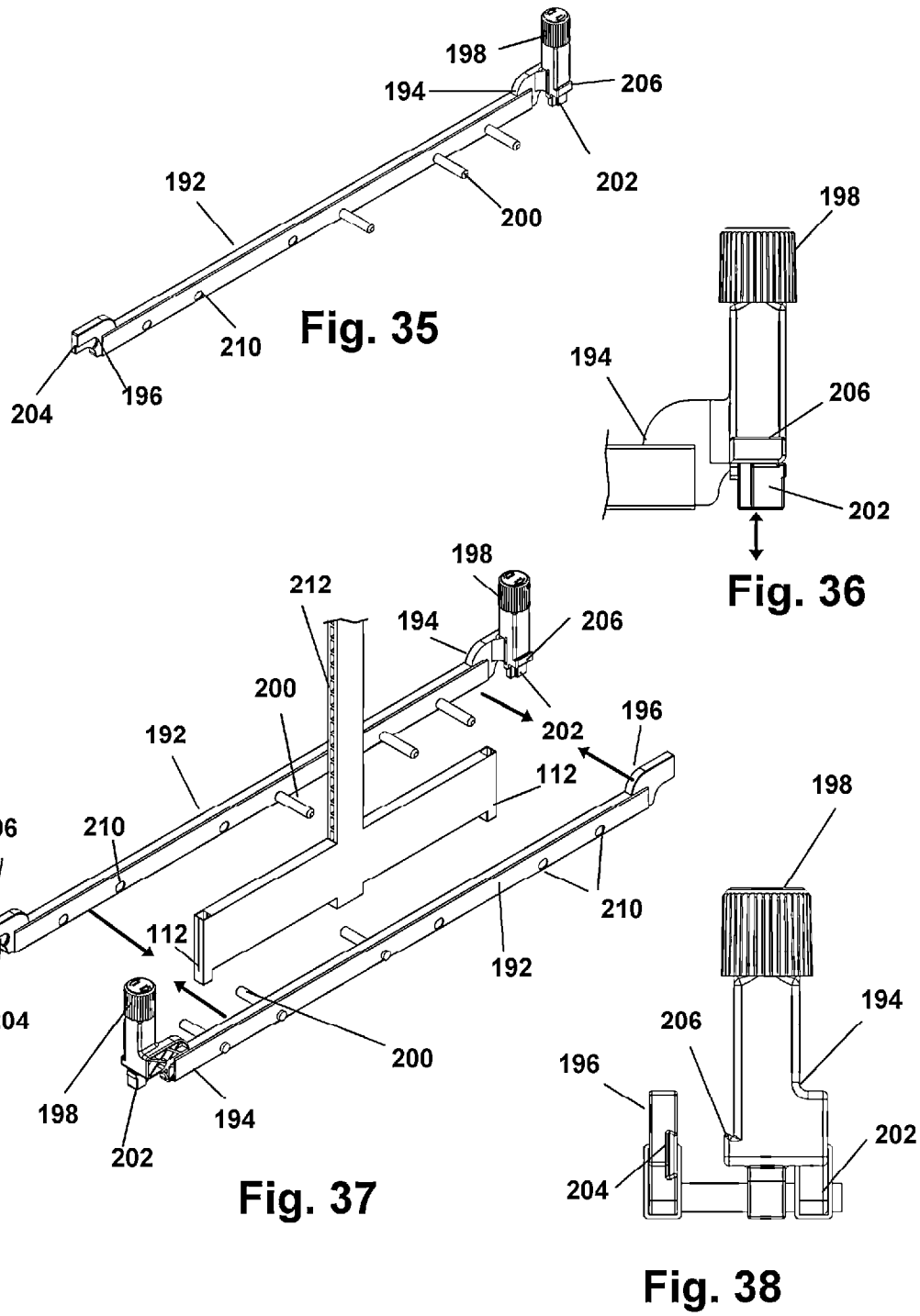

LIFTING SYSTEM FOR DISPLAY CASES

This application is a continuation in part to U.S. application Ser. No. 11/704,474 filed Feb. 8, 2007 which claims priority to U.S. Provisional Patent Application Ser. No. 60/771,985 filed Feb. 9, 2006, and additionally claims priority to U.S. Provisional Patent Application Ser. No. 61/653,409 filed May 31, 2012.

BACKGROUND OF THE INVENTION

1. Field of the Invention

The present invention relates to dollies and lifting components for store shelves conventionally known as gondolas. More particularly, it relates to dollies employed in the moving of large storage and display structures such as retail store display cases. Such display shelves and cases include retail store gondolas, file cabinets, shelving, and other such storage and display components which employ a system of legs for support on a floor surface.

2. Prior Art

Storage and display shelving and cases are an everyday fact of life in a modern society. Because floor space in most retail stores, storage warehouses, and office buildings is at such a premium, the display and storage of merchandise, the storage of files and records, along with storage of an infinite number of other items, has progressed upward. In order to conserve floor space in retail and commercial situations and to provide better viewing and access to products, shelving is commonly employed to hold products. In a retail setting such shelving is generally arranged to form aisles for customers to traverse through adjacent shelve structures. In a commercial or warehouse setting, a similar aisle configuration is conventionally employed. The shelves in this configuration give the customers and users a much better view of the products being stored. Further, holding capacity of the products in a finite floor space is greatly increased by vertical stacking above a small footprint on the floor.

In warehouses where goods and products are stored for distribution or shipping, shelving is also employed to increase the storage capacity in the given floor space and to organize the inventory. Offices also use shelving to hold records and to display goods as well as employing leg-supported file cabinets to organize and hold volumes of files.

All such shelving and cabinets, whether in retail stores, warehouses, or offices, must be structurally able to support the load intended. This structural support, being generally metal, makes the shelving heavy. A vexing problem of such shelving, by nature of its need to support a load, is the elevated weight rendering the shelves ungainly. This is especially true when such shelving is loaded with heavy products for sale such as canned goods in a supermarket. The elevated inventory can increase the total weight of the shelf supporting it to a multiple many times that of the shelf itself.

A variety of jacks and dollies have been introduced in the past, most of which pertain to the lifting of such cabinets which employ vertical support legs with an adjustable leveling foot extending from a bottom end and employed to level the shelves. However, most conventional products used for the purpose fail to provide a unified system of components, to lift, move, and subsequently re-place the shelf in position. Instead, conventional systems employ various jacks, forklifts and such for the purpose. This results in much time wasted and often damaged shelving from the ill-designed devices employed.

This is especially true when the moving of shelves is required during the remodeling or renovation of retail stores such as grocery stores, drug stores and the like. During such a remodeling process, it is often necessary to move large display cases, conventionally known as gondolas, which hold everything from tooth paste to canned soup. Moving them generally requires repositioning the shelves or gondolas from one part of the store to another. Often during a store remodeling process, the shelves will need to be moved multiple times to allow for various phases of construction and repositioning of merchandise to new locations.

As noted, such display cases or gondolas are large, heavy, and have extending shelves which hold and display a very large number of small products for sale increasing the shelving weight. The placement of heavy products in an elevated position from the floor also makes the shelves ungainly and predisposed to tip if raised too far from the support surface when elevated with products remaining on the shelves. However, with the cost of labor and time involved in relocating the shelves, and/or the products in conjunction therewith, removing and replacing the products each time the display case is to be relocated would be especially expensive. The need to remove and replace potentially thousands of individual products supported on the shelves, can also play havoc with the short time schedules allotted for the remodeling process to minimize lost sales. As such, device and system providing a means for moving display cases and other heavy storage devices while fully loaded with products or other stored items is highly desirable.

In some instances shorter and smaller loaded display cases might be relocated with any suitable lifting apparatus, such as conventional fork lifts or floor jacks which place them on conventional flat surfaced dollies for transport. However, such means for movement is fraught with potential for damage to the cases themselves and the products thereon.

Additionally, most display cases such as those in grocery store aisles are very long and not suited for this type of movement. Further, as is conventional in retail sales establishments such as supermarkets, the display cases are connected together in long sets, and placed parallel to each other with gaps to form the aisles in the store. Lifting a fifty foot long display case with a floor jack for positioning on a dolly would cause severe damage to such elongated structures. Consequently, transport by floor jack or flat dollies is not an option for conventional elongated display cases which are also known as gondolas.

Further, because storage and display properties of such display cases generally yield shelves very close to opposing shelves on the same display aisle, frequently there is insufficient space in the aisle formed between adjacent display cases for entry of a fork lift or large flat surfaced dolly.

Consequently in supermarkets and retail stores employing long gondolas on formed aisles to display products, the employment of one or more forklifts is simply not physically possible in the cramped confines of the store.

Additionally, while small dollies have been manufactured to engage with portions of the underlying support structure of the shelves, the ever-widening variety and construction of such support structures has made it hard to employ small dollies which will accommodate the width and legs of different types of supports.

As such, there is a continuing unmet need for an improved device and system of inter-working components and a method that provides for easy, quick, and safe movement of large heavily loaded display cases and gondolas. Such a system should be easily adapted to the job at hand and type of shelving and supports involved. Still further, such a system should be safe to use for workers and should curtail accidents by preventing tipping of the heavy shelves when lifted.

SUMMARY OF THE INVENTION

The device and method herein disclosed and described achieves the above-mentioned goals through the provision of an adaptive lifting system that in a first particularly preferred mode allows for a compressive gripping engagement of the upright posts of the frame of the shelving which supports the load on engaged shelves and products. However, other preferred modes described later provide means for non-compressive engagement.

Such vertically disposed support posts are conventionally hidden from view behind a vertically disposed shelf kick plate which extends between the bottom of the shelf closest to the floor and the floor supporting it. This kick plate blocks viewing of the floor and distal ends of the support posts for aesthetic reasons. Some shelves and gondolas have an open area exposing the support posts, but most have this kickplate that must be accommodated. Thus the kick plat also blocks access to and engagement to the support posts.

The device and method in a first preferred mode is especially adapted for lifting and movement of such shelves by providing a means for engaging gondola shelving support posts, sufficient to lift them, without removing the face place to access the support posts. In use the device allows the use of a plurality of the devices herein mounted on wheeled dollies, to engage a plurality of the support posts of each gondola. The dollies have at least two wheels or skids or other means for supporting the load to be lifted by the dolly, and to roll in the direction steered by the user depending on the direction of force exerted by the user.

The dollies are especially well adapted to the task at hand in that each provides a compressive and frictionally engaging means for gripping the support posts of the shelf. Such an engaging means in the current preferred modes of the device is provided by opposing members adapted to engage the support post with sufficient opposing compressive force to lift the support post from the ground once engaged. This engaging means is also calibrated to prevent crushing and deformation of the support post during this process which is extremely important.

In one mode of the device, the members grasping the support post are closed by a handle and cam arrangement configuring the shape of the inside surface of both opposing members to match the post configuration. A hand-operated handle thrusts a sliding beam toward a cam which forces the opposing members closed only a distance sufficient to grip but not deform the support post. In a particularly preferred mode of the device, the grasping members are forced toward each other at respective distal ends by the tapered distal end of a threaded rotating member engaged with a lifting carriage. This taper which is most preferred provides for a release from contact with the members for engagement to the post, and a progressive closing of the members to a locked engagement to the posts. However, other means for biasing the opposing members together with sufficient force to allow lifting of the compressibly engaged support member are anticipated.

The dolly, once the support members are engaged, has an onboard means for elevating the opposing members once engaged on the support member which provides sufficient mechanical advantage to make elevation of the support post and its connected section of the shelving relatively easy for the user. Further provided is a locking means preventing the release of the opposing members grip upon the elevated support member any time it is elevated from the floor to thereby prevent accidental release during use. Only when the opposing members gripping the upright support post are lowered to a position adjacent to the floor are the opposing members released from their engagement to the support post.

Also provided with the system is a means for momentarily elevating the kickplate extending between the floor and bottommost shelf which blocks access to the support posts of most conventional gondolas and shelving employed in stores such as Walmart and other local and national stores.

In the current preferred mode of the device, this means for deflecting or elevating the kickplate or fascia component is provided by a tapered top surface at the distal end on both opposing members, or a tool having a sloped top surface, either of which when moved toward the support member with sufficient force will cause the kickplate to deflect and rise sufficiently in an elevated position to provide access to the support post by the opposing members. An angled surface provides a footplate for engagement of the user's foot with the dolly on the opposite side of the opposing members to force the dolly forward. An engageable handle also provides a means for concurrently allowing the user to use his arms with the one foot on the angled surface forming the footplate to exert an increased forward force upon the engaged dolly. Using his foot and hands makes it relatively easy for the user to move the opposing members forward with sufficient force to deform the kick plate in the area of the shelf or gondola where the support post is located during initial engagement of the opposing members around the support post.

Another component employed in one preferred mode of the device features a means for preventing engagement of the setting component to the dolly, unless two opposing members are lowered to a position substantially adjacent to the floor or support surface for the support post. This is accomplished currently by a pin and socket arrangement between the setting component and the dolly that prevents engagement if the opposing members of the dolly are not substantially lowered to the floor. It prevents damage to the shelving and kickplate from a user who might try to force the dolly forward when the opposing members are too high from the ground. Another preferred mode of the device allows for freewheeling or play of the distal ends of the opposing members when adjacent to the floor.

Also provided on the preferred modes of the device disclosed is a means for spreading the opposing members during engagement to the support post. In the preferred modes of the device, this is a valued function since as noted below, an aperture formed between the opposing members engages two opposing sides of the support post, and when closed, wraps around two outside corners of the support post to allow engagement of the corners and one side of the post that is traverse to the two opposing parallel sides.

In order for the opposing members to encircle the support post in such a fashion, the opposing members must be spread apart to allow passage of the support post therebetween. the support post. Currently a tapered leading inside edge of both the opposing members communicating with the engagement aperture formed therebetween provides this function. When forced forward in the aforementioned fashion, the opposing members will momentarily spread apart through contact of the inside edge with the support post and then move back to a neutral position once the support post is encircled by the aperture.

As noted, the wheeled dolly also has an onboard means for elevating the opposing members. Once the support post is engaged between the opposing members, the elevation means provides sufficient mechanical advantage to make elevation of the support post relatively easy for the user. Currently a screw or threaded member adapted for engagement to an external tool through the top surface of the dolly provides for the lifting capability.

When the threads formed around the circumference of the screw are rotated with the screw which is in a threaded engagement with a sliding lift chassis operatively engaged with the two opposing members, a lifting of the support post is achieved. Twisting the adjustment screw raises the chassis and the engaged opposing members which have the support engaged thus elevating the gondola shelf. The adjustment provides an interlock to bias the opposing members closed. Once interlocked, the opposing members are locked in place such that they will not release their grip on the raised support post while it is elevated. This is an important feature especially when the device is used with unskilled labor or employees who do not use the equipment much to insure their safety. Other means for locking the opposing members on the support post could be used and are anticipated; however, the current disclosed embodiments work well since they are passive and do not require the user to actually take the step of locking the opposing members as it is automatic.

The wheels supporting the dolly are preferably casters which are fully swiveling and each dolly has at least two caster style wheel assemblies with each caster sized in accordance with the load to be supported. Additional support to prevent forward rotation of the dolly when so engaged is provided by an elongated face or surface support having a surface adapted for engagement against the exterior surface of the support post or the kickplate or fascia (if present) in a contact engagement.

By employing this elongated face surface, additional stability is provided since the contact with the support posts provides a means for preventing rotation of the dolly forward or toward the shelf which might cause a disengagement while in use.

The elongated face of the support surface is translatable toward the exterior surface of the support posts to a contact therewith to provide biased engagement thereon for improved securement. This surface contact on one side and wraparound engagement of the support post on the other side of the support post is therefore most preferred as providing the most stability of the connection of the device to the shelf.

Generally, single wheel casters formed from a plastic material that will not mar the flooring are effective. However, where a very heavy load is to be moved, a wider caster wheel is preferred which distributes the load over a larger wheel/floor contact surface to prevent marring the floor.

However, it is noted that the engaging means of the current mode of the device applies a compressive force to the support posts for engagement and operative lifting thereof, where support posts vary in size, especially when smaller than expected, a good compressive grip on the post can elude the current mode. This can be problematic when the device has a safety which will not allow operation of the lifting component or jack unless the jaws obtain a proper grip on the support post. Also, due to the immense weight of loaded display cases, if the support posts have been crushed or disfigured slightly in previous lifts, it can be hard or impossible to achieve the comparable compressive force to the support post you provide a safe non-slip engagement to the posts for lifting. Slippages may require even more compressive force to the circumference of the post which can cause damage to the support posts, and at times, damage the device itself.

As such, in yet another particularly preferred mode of the invention, there is provided a device and system of interworking components, which enable a method for easy non-damaging engagement to gondola support posts to allow for easy, quick, elevation and safe movement of large heavily loaded display cases and gondolas.

This preferred mode provides an adaptive lifting system that achieves a supportive engagement with the gondola support posts without the need for opposing compressive jaws to compress upon the exterior surfaces of vertical gondola support posts. The device herein instead employs the overturning moment of the support post as a means for a torqued engagement of the upright posts of the frame of the shelving which supports the load on engaged shelves and products. The engagement using the overturning moment can be used exclusively or in combination with compressively engaging devices noted above should a compressive engagement be hard to achieve due to post wall compression or damages forming a reduced circumference or uneven sides on the vertical support post.

The device and method in the current mode is especially adapted for lifting and movement of such shelves by providing a means for non-compressively engaging gondola shelving support posts, sufficient to lift them, without removing the face plate to access the support posts. In use the device allows the use of a plurality of the devices herein mounted on wheeled dollies, to engage a plurality of the support posts of each gondola.

The dollies are especially well adapted to the task at hand in that each provides a means for engaging the support posts sufficient to lift them by employing the misalignment of the support post through the aperture of the opposing jaws at an overturning moment, to achieve essentially a torqued engaging means for gripping the support posts of the shelf. Such a means for non compressive engagement in the current preferred modes of the device is provided by opposing members having half apertures formed to form a pathway between the two sized to wrap around the support post.

So positioned, the post communicating through the formed aperture mis alines in its communication therethrough at an overturning moment. Contact with the side surface forming the aperture or pathway provide a means for engagement of the dolly to the support post sufficient to raise the support post off the support surface. The engagement at the overturning moment achieves what can be described as a torqued engagement of the surfaces of the aperture pathway, with at least two sides of the support post. A gnarled or toothed gripping surface is formed into the side surfaces of the pathway which is especially preferred as it maintains a liftable engagement with the support post.

Thus the angled overturning moment wedges the support post within the jaws forming an engagement which is enhanced by the gnarled or toothed surfacing. A subsequent elevation of the jaws causes a lifting of the support post from the ground once engaged, without the need for compressing or crimping the exterior circumference of the support post. This engaging means may also employ a gap formed by the surfaces of the aperture formed between the halves or members, calibrated to prevent crushing and deformation of the support post during this process which is extremely important.

Also provided on the current preferred modes of the device disclosed is a means for spreading the opposing members during engagement to the support post. In the preferred modes of the device, this is a valued function since as noted below, an aperture formed between the opposing members is defined by surfaces and form the engagement with at least two opposing sides of the support post. This engagement occurs when the opposing members are closed by moving them closest to each other and thereby provides a misalignment of the support post with the formed aperture to form an engagement about the two side surfaces with or without engaging the remaining sides of the posts.

In still further preferred mode, lifter bar components are provided and employed for lifting display structures, cases, or gondolas which have support posts which may be unreachable through conventional employment of the dolly. The lifter bars are engage directly to the support of the display case and once engaged, are lifted to raise the case as well. The lifter bar comprises an elongated bar having a translatable support leg at one end which provides an engagement leg for dolly.

It is known that there exists many display case types other than conventional gondolas and shelving type structures previously discussed. However it is noted that the dolly of the present invention is capable of employment with essentially any type display or storage structure known in the art, even those not having readily accessible support posts as described previously. For example, conventional pallet rack support structures are one such type of structure which do not have support posts which are suitable for engagement with the jaws of the dolly. However, in still other modes, a particularly preferred pallet rack adapter is provided. The adapter includes a body which is adapted to engage the support leg of a conventional pallet rack support structure. There is additionally included a support post engaged to the body which is employed as an engagement post for the jaws of the dolly.

Still further, the device is providable to the user as a kit, which comprises a plurality of the components of the device previously described. The kit components preferably comprises a transportable storage and carrying container which can be readily shipped as needed.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

It is an object of this invention to provide an improved dolly system for the moving of shelving and storage racks and the like that is inherently safe to use.

It is an additional object of this invention to provide such a dolly system that also has passive locking of the dolly to the shelf when elevated to prevent accidental release.

A further object of this invention is the provision of such a dolly system that allows for a plurality of such dollies to engage a shelf at multiple points and thereafter raise the shelf for rolled movement.

It is yet another object of the invention in other preferred modes to provide such a dolly system employing non-compressive torqued engagement to the support posts of the shelf.

It is another object of the invention to provide a kit of a plurality of components which can be stored and shipped within a compartmentalized container.

These together with other objects and advantages which become subsequently apparent reside in the details of the construction and operation as more fully hereinafter described and claimed, reference being had to the accompanying drawings forming a part thereof, wherein like numerals refer to like parts throughout.

BRIEF DESCRIPTION OF DRAWING FIGURES

FIG. 16 is an exploded view of the opposing members and the rotating member having a tapered distal end and external threads forming an engageable screw with threads of the lift chassis.

FIG. 17 is a sliced view of the components of FIG. 16 operatively assembled and showing the opposing members engaged to a support post and the face abutted against the surface of the kickplate with both elevated from a supporting floor.

FIG. 18 is a top plan view of the opposing members in a wrap-around compressed frictional engagement to a support post.

FIG. 19 depicts a sectional view showing the two opposing members in their first position adjacent to the supporting floor.

FIG. 20 depicts a slice through FIG. 18 showing the opposing members in their second or elevated position in a wrap-around compressed engagement to the support post.

FIG. 30 shows a sectional view of the engagement of the members to the support member of FIG. 8.

FIG. 31 depicts a sectional view along line 10-10 of FIG. 9, showing gnarling or formed teeth in the sidewall of the opposing members of FIG. 9 which significantly increases the grip of the device when in the engaged mode.

FIG. 32 shows a kickplate deflector which may be employed with the device of FIG. 8 where the increased depth of the opposing members renders them less than efficient in sliding under the kick plate board extending between the bottom of the gondola and the floor.

FIG. 35 shows a view of a preferred lifter bar which can be employed for lifting display cases not having easily accessible support posts.

FIG. 36 shows a close up of the lifting end of the lifter bar providing a support leg for engagement to the jaws of the dolly.

FIG. 37 shows a set of lifter bars disposed in opposing arrangements prior to engagement to a display case.

FIG. 38 shows an end view of an engagement of a set of opposing lifter bars.

FIG. 41b shows a rear perspective view of the adapter of FIG. 41a.

DETAILED DESCRIPTION OF THE PREFERRED EMBODIMENTS OF THE INVENTION

Figure 1:
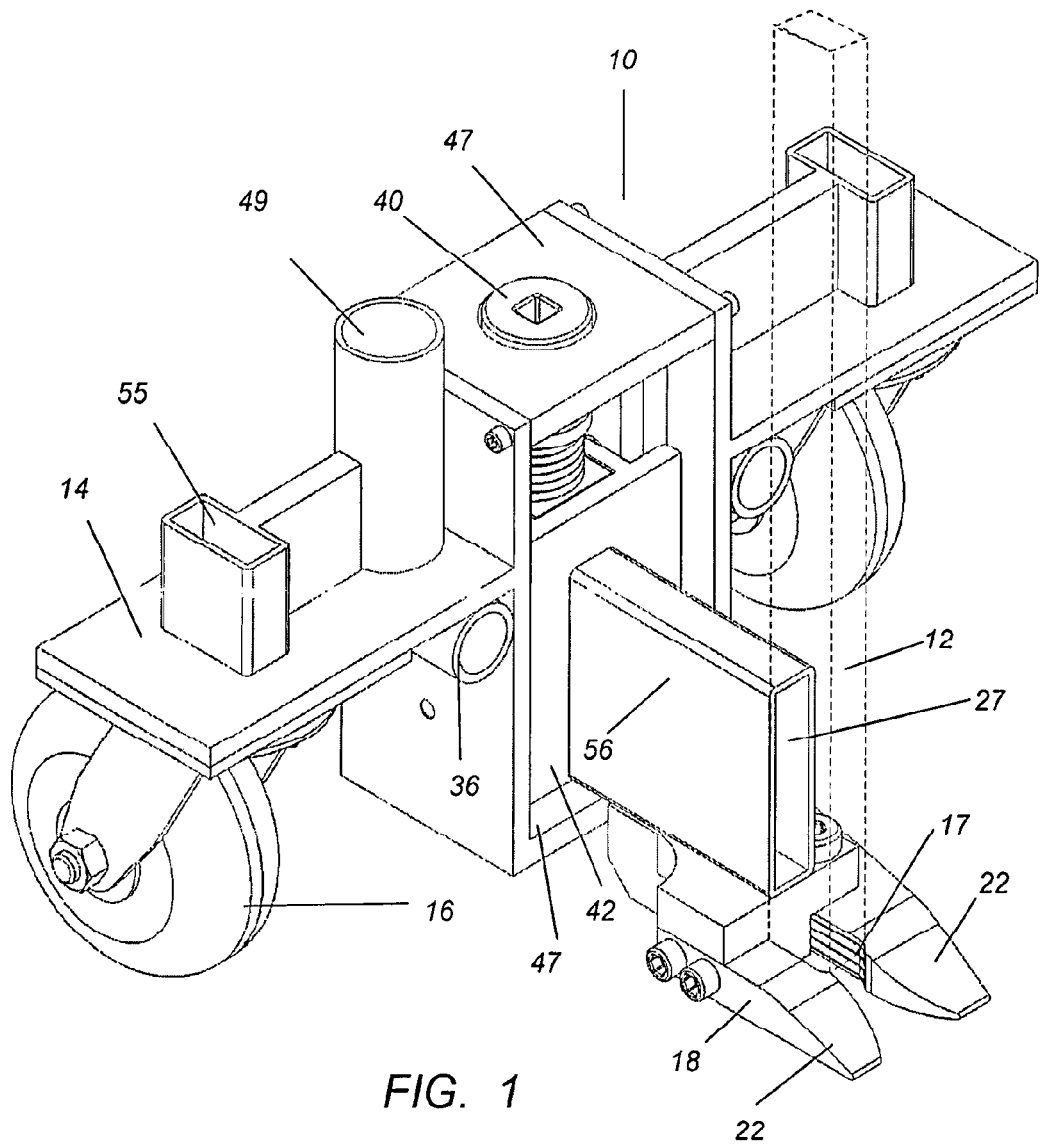
FIG. 1 depicts a perspective view of a preferred mode of the device showing the dolly from the side engaging a gondola or shelf and shows the opposing members adapted for a wrap-around frictional engagement.
Figure 2:
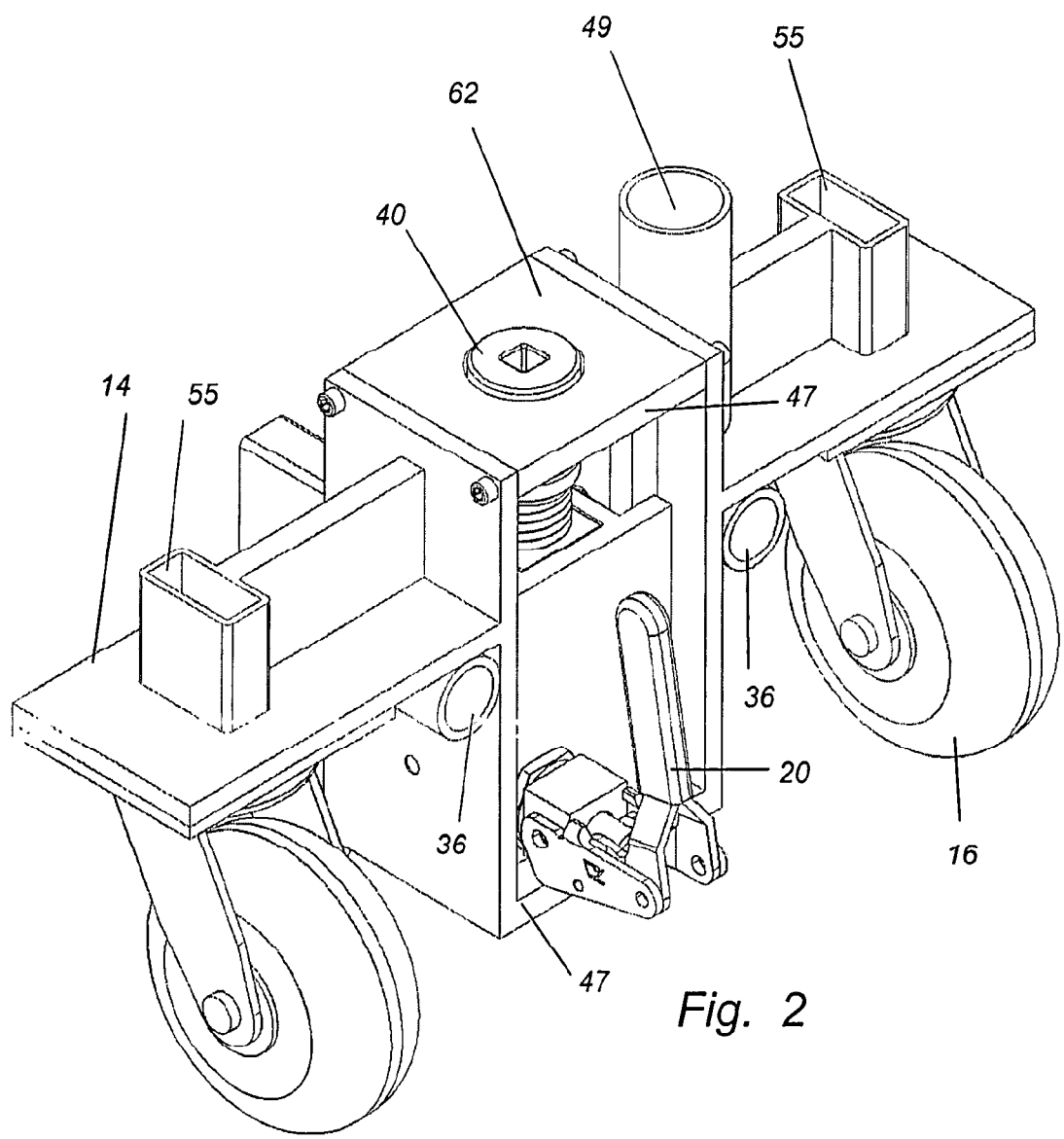
FIG. 2 is a perspective view of the dolly from the side opposite that of FIG. 1.
Figure 3:
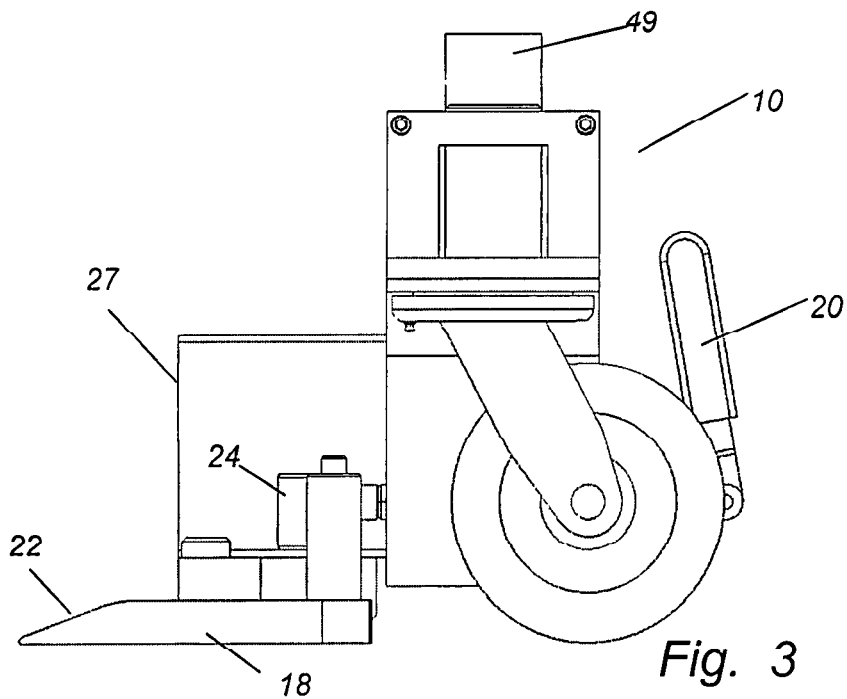
FIG. 3 shows a side view of the device and the tapered distal ends of the opposing members.
Figure 4:
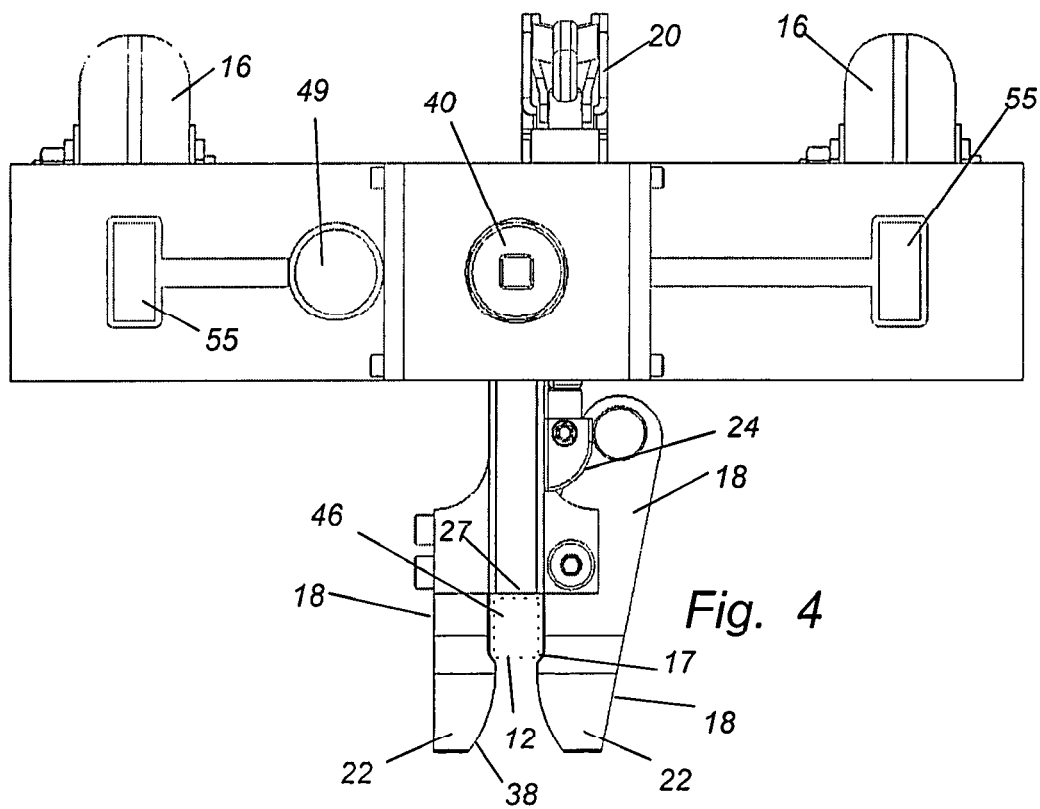
FIG. 4 is a top plan view of the device showing the adjustment screw and collar engagements for a handle and for support members that engage adjacent dollies.
Figure 5:
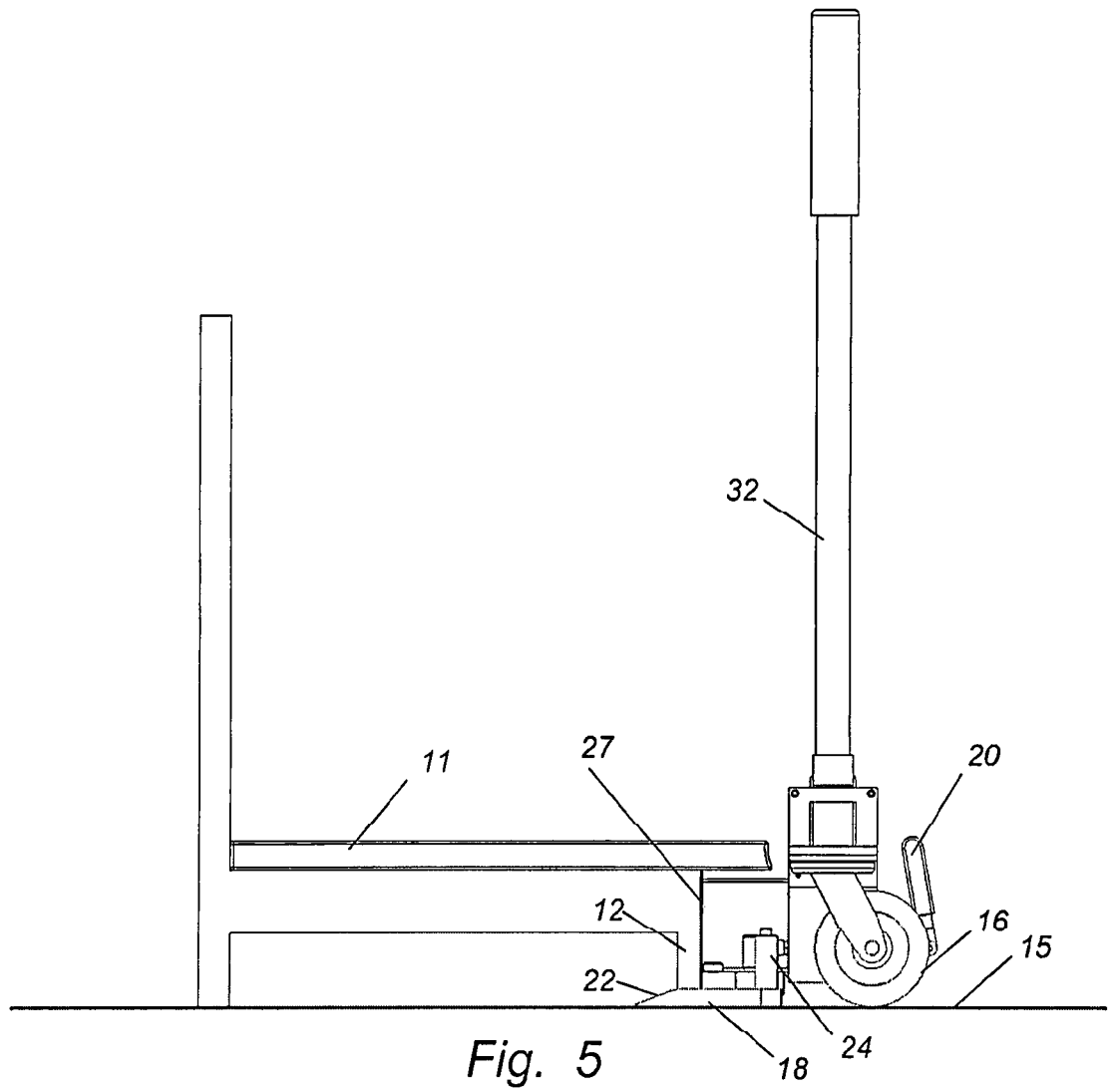
FIG. 5 depicts a side view of the device engaged around a support post of a shelf or gondola.

Referring now to the drawings of FIGS. 1-42, the modes of the device 10 and method herein disclosed feature an easy to use component system to engage support posts 12 of conventional gondolas and shelves 11 for movement of the shelf 11 with or without the merchandise thereon. Such vertically disposed support posts 12 are generally hidden from view behind a kick plate 13 shown in FIG. 9 which extends between the lowest shelf of the structure and the floor 15 supporting it, thereby blocking access to the support post 12.

Moving such shelves 11 with the two modes of the device 10 herein entails attaching a plurality of small wheeled dollies 14 to a plurality of the support posts 12 hidden behind the kickplates 13 if they are present. Each dolly 14 has at least two wheels 16 adapted to support the shelf 11 supporting merchandise and to roll on the wheels 16 once elevated.

In all modes the dolly 14 employs means for gripping the support post 12 to which it is attached which in all preferred modes of the device 10 currently employ two opposing members 18 adapted on their inner face 38 to engage the post 12 with sufficient opposing force, to be able to lift the support post 12 from the ground 15 when the opposing members are translated upward. It is important not to crush or deform the post 12 during this process.

Figure 10:
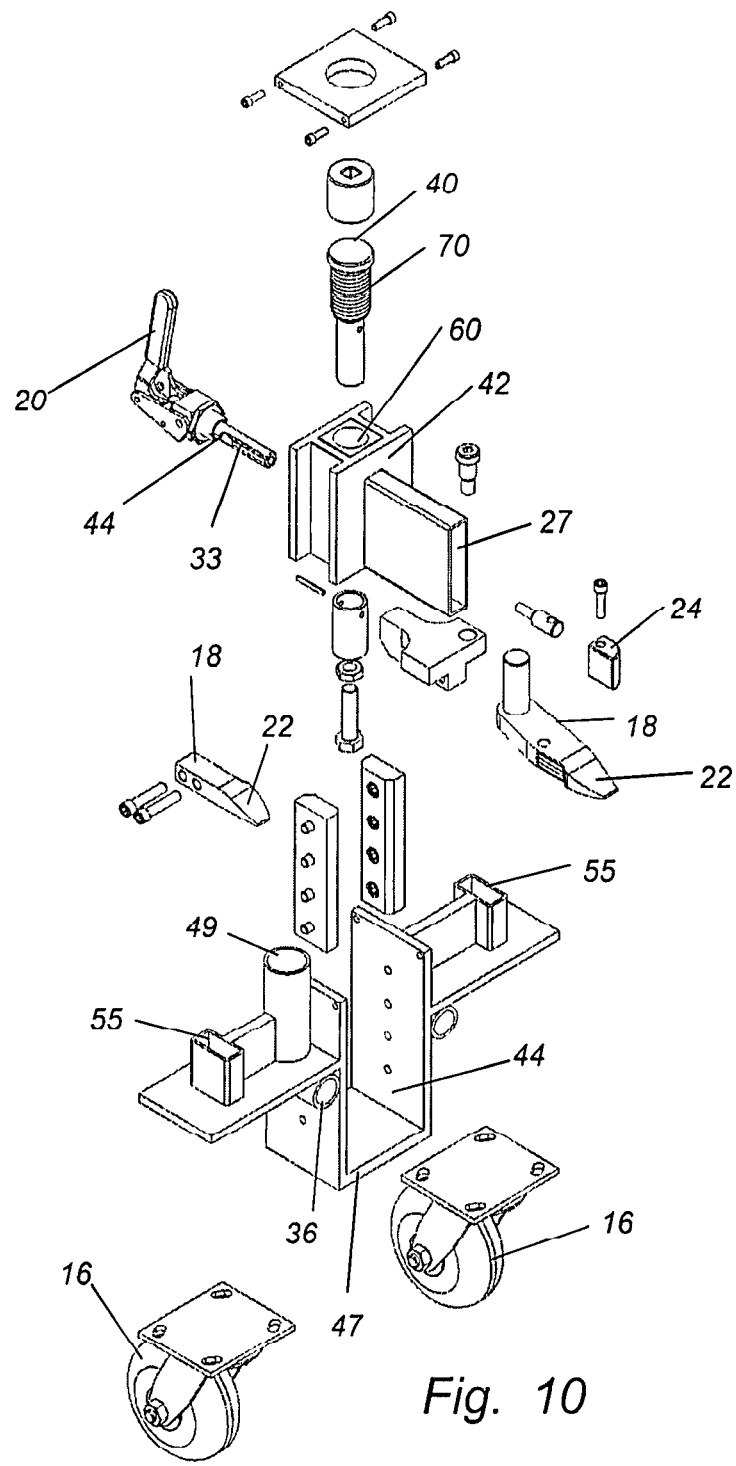
FIG. 10 is an exploded view of the dolly and engaged sliding chassis showing the sliding member and locking engagement with the adjusting screw.

One current preferred mode to impart sufficient force employs a handle 20 engaged with a cam 24 shown in FIG. 10. Raising the handle 20 in its engagement to the dolly causes a sliding member 33 to move the cam 24 to force the opposing members 18 to a closed position from an open position. The amount of forward movement of the sliding member 33 and shape of the cam 24 determine the ultimate force placed on the post 12 in conjunction with the shape and size of an aperture 46 formed in the inner face 38 of the opposing members 18. As can be seen in FIG. 10, changes in this geometry can change the force imparted and such can be easily adapted to different sized posts. Another particularly preferred means for biasing the opposing members 18 together with sufficient force to allow lifting of the post 12 are shown in FIGS. 16-20 and described below. As noted below, this mode allows for freewheeling of the members 18 in the lower position and a tapered surface forcing the members 18 closed and locked. Of course other means for forcing the opposing members 18 toward each other as would occur to those skilled in the art are anticipated.

As shown in a first preferred mode of the device 10 in FIGS. 1-10, a dolly mounted means for elevating the opposing members 18 and hence the support post 12 once it is engaged, is provided by a screw 40 which is adapted for engagement and rotation by an external tool through the top surface of dolly 14. The screw 40 is rotated in its threaded engagement with a sliding lift chassis 42 to which the opposing members 18 are engaged. Of course the opposing members 18 can be removably engaged to allow differently configured members 18 adapted to different sized and shaped support posts 12 to be easily attached and used with the device 10 rendering it very adaptable to any situation.

Rotating the adjustment screw 40 raises the lift chassis 42 portion of the device translationally engaged in the slot 44 of the dolly 14 and thereby raises the opposing members 18 which are frictionally engaged in a compressed attachment with the support post 12. This allows the shelf 11 to be lifted at each support post 12 easily. In the first preferred mode of the device 10 of FIG. 10, the adjustment screw 40 is adapted to interlock with a slot 44 formed in the sliding beam 33. Once interlocked by raising the handle 20 to close the opposing members 18, the sliding beam 33 is locked in place to hold the opposing members 18 which then cannot lose their grip on the raised support post 12 while it is elevated. The especially preferred mode of the device 10 of FIGS. 11-20 provide a similar means for locking the opposing members 18 as described below. Of course other means for locking the opposing members 18 on the support post 12 and prevent their disengagement therefrom during elevation of the support post 12 could be used and are anticipated. However, the current disclosed means for locking the opposing members 18 is especially preferred since it does not require the user to actually take an active step of locking the opposing members 18 because locking occurs automatically by translation of the screw 40 against the member 18.

Also provided with both modes of the device 10 is a means for momentarily elevating the kickplate 13 which as noted conventionally blocks the view of, and therefor access to, the support posts 12. In both current preferred modes of the device 10 this means for deflecting or elevate the kickplate 13 or fascia component is provided by tapered top surfaces 22 at both distal ends of the opposing members 18 which will elevate the kickplate 13 sufficiently when forced thereunder thereby providing access to the support post 12.

A handle 48 will engage a collar 49 on the dolly 14 in both modes of the device to provide a means for pushing the device 10 on the floor 15 during transport to and from the shelf 11. Generally the concurrent hand and foot pushing of the dolly 12 only occurs when setting the members 18 around a support post 12 and under a kickplate 13 if employed on the shelf 11.

Figure 6:
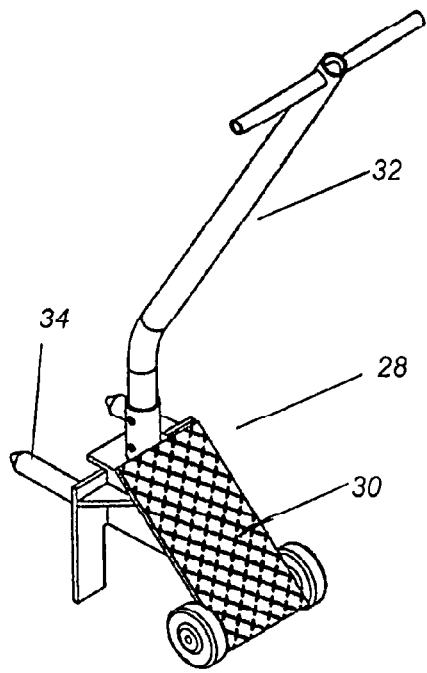
FIG. 6 shows a rear view of a setting component adapted to engage the dolly during setting of the dolly to the shelf support post and moving of the shelving when multiple dollies are attached.
Figure 7:
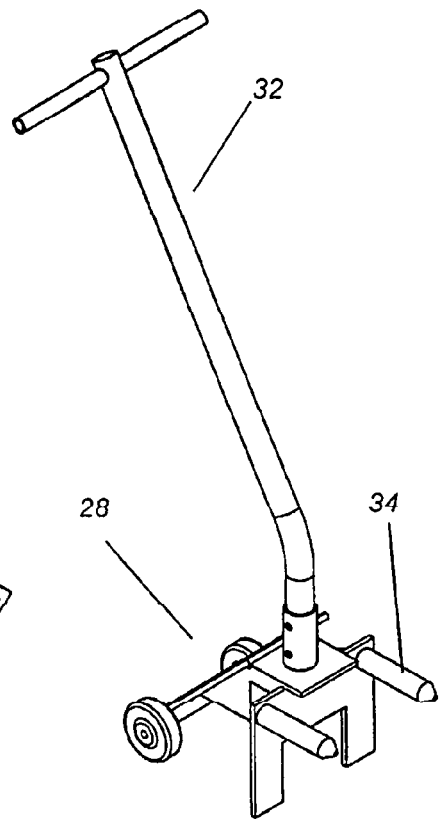
FIG. 7 shows the pins projecting from the setting component adapted to engage mating collars on the dolly.
Figure 8:
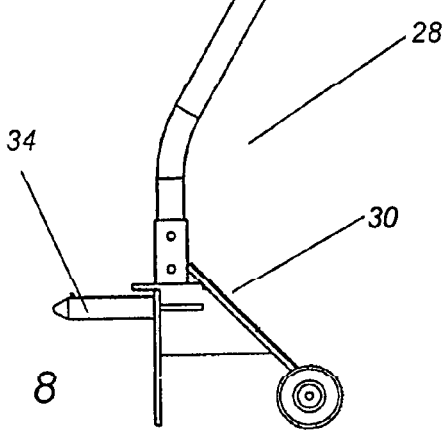
FIG. 8 depicts a side view of FIGS. 6 and 7.

In the two-piece mode of the device 10 a means for preventing engagement of the setting component 28 to the dolly 14 is provided and operates to prevent cooperative engagement unless the two opposing members 18 are lowered to a position substantially adjacent to the floor 15 or support surface for the support post 12. This is accomplished currently by a pin 34 and socket 36 arrangement between the setting component 28 and the dolly 14. The setting component includes an angled footplate 30, and handle 32 as shown in FIGS. 6-8.

With the sliding chassis 42 properly adjusted using a bottoming component the opposing members will be in their proper position at a bottom or lowest position. The sockets on the dolly will then align with the pins 34 to allow engagement. If the opposing members 18 are not properly adjusted, the engagement is misaligned.

It is preferred in all modes of the device that the aperture 46 formed on the inner face 38 of both opposing members 18 allow the face 38 at the point of the aperture 46 to engage two opposite side surfaces of the support post 12, and, provide a wrap-around 17 of the third side traverse to the first two and thereby provide a means for engagement of the opposing members around the corners of the support post 12 opposite the elongated face 27. This is shown best in FIGS. 4 and 17-20. This wrap around engagement provides a much more secure mount and prevents rotation of the dolly toward and away from its engagement with the fourth side of the support post 12 or the kickplate 13 if in place. Also preferred for the most support is elongated face 27 which is surfaced to be substantially parallel to the axis of the support post 12 and provides a flat surface for the wrap-around 17 engagement, against which to force the post 12.

Because this wrap-around engagement narrows the gap between the opposing members 18, in both modes of the device 10, at the distal ends of the members to a distance less than "D" when in the engaged position, a means for spreading the opposing members during engagement to the support post 12, to distance wider than "D" is preferably provided. This too is preferably a passive component to allow for low skilled labor and is provided by a tapered leading inside edge 38 of both opposing members 18 communicating with the engagement aperture 46 formed therebetween. When forced forward in the aforementioned fashion, the opposing members 18 will naturally separate apart before moving back to a neutral position once the support post 12 is encircled by the aperture 46 on two sides and at least two corners opposite the kick plate 13. Further, on the most preferred mode of the device an extending arm 75 will contact the support post 12 when forced toward it, and close the opposing members 18 automatically.

Generally, single wheel casters formed from a plastic material that will not mar the flooring are effective for wheels 16 for all modes of the device 10. However, where a very heavy load is to be moved, a wider caster wheel is preferred, which distributes the load over a larger wheel/floor contact surface to prevent marring the floor.

Figure 9:
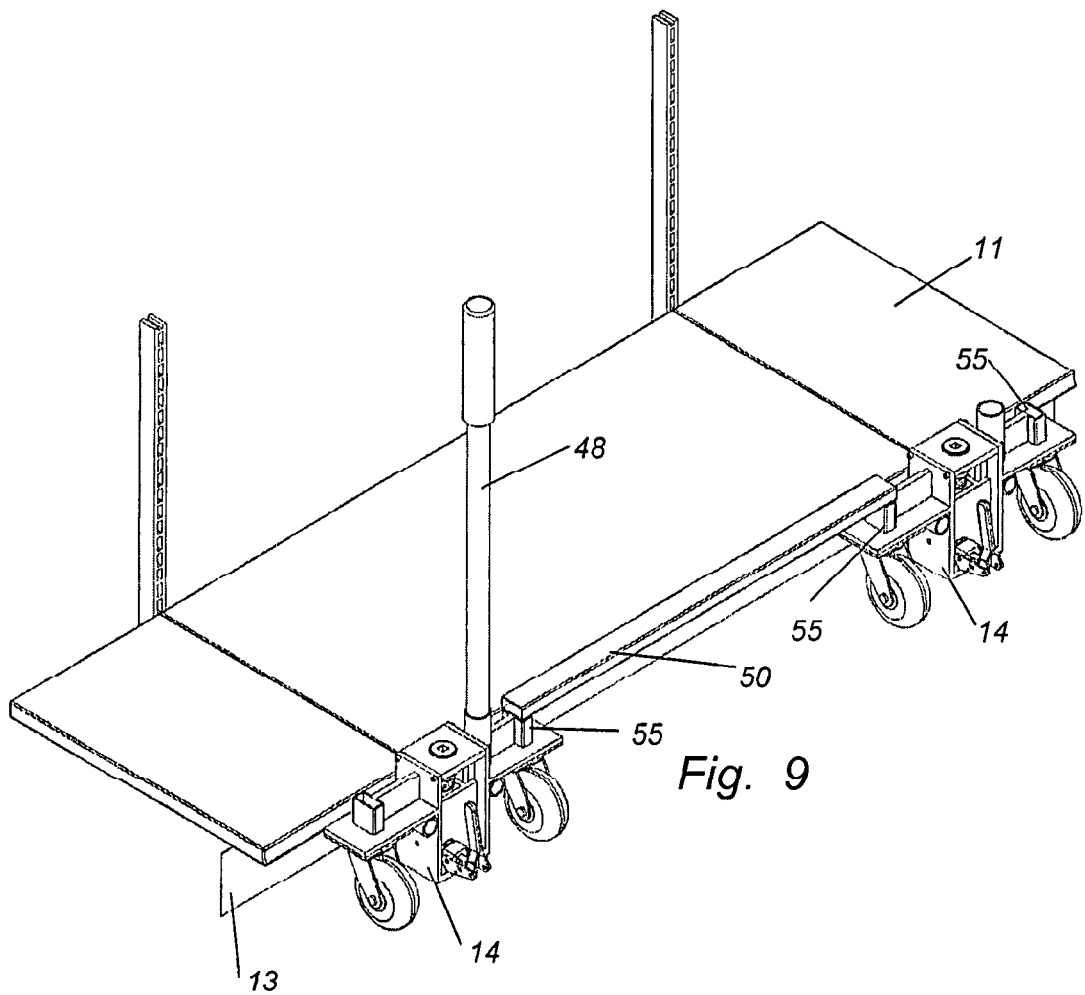
FIG. 9 shows the engagement of a plurality of dollies to a conventional shelf and the engageable support member that attaches between adjacent dollies to provide lateral support during rolling of the shelves.

In both modes of the device herein, and shown in FIG. 9, the dollies 14 are adapted to be engaged to each other at multiple support posts 12 on each gondola or shelf 11 to be moved, especially if they are loaded with merchandise. It has been found through experimentation that the addition of removably engageable members shown as connector bars 50 which are adapted on each respective end to provide a connection between each adjacent dolly 14 such as using mount 55, provide a marked increase in the stability of the devices in their engagement and in the raised shelf 11. Consequently, in all preferred modes of the device 10, connector bars 50 adapted at both ends to engage adjacent dollies 14 would be employed thereby connecting all the individual dollies 14 on each side of the shelf being moved to form a single shelf elevation unit. So engaged, the multiple dollies 14 and connector bars 50 provide a means for imparting lateral support to the engaged shelf 11 and means for providing unitary movement of a plurality of shelf-engaged dollies during transit of the shelf 11.

Figure 11:
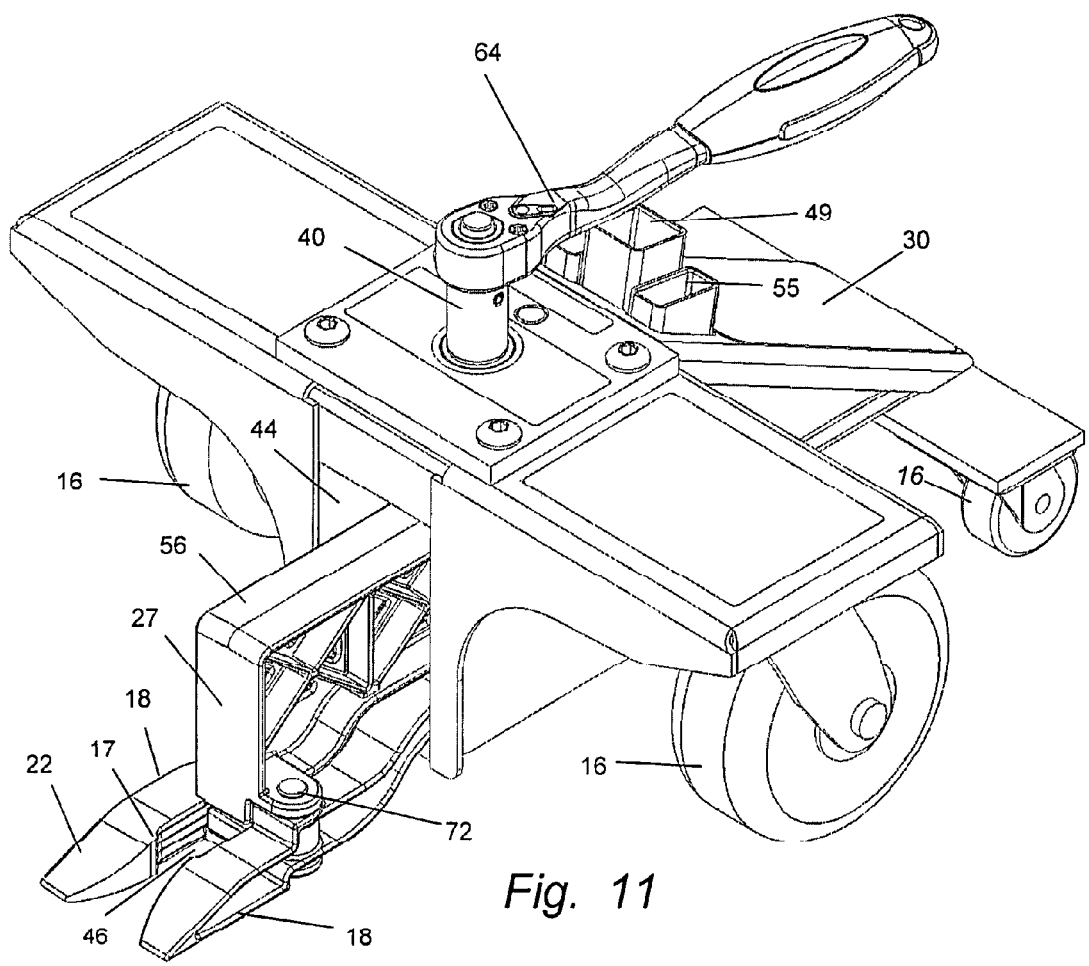
FIG. 11 is a perspective view of an especially preferred mode of the device showing a single piece unit having a footplate extending from the side opposite of the dolly from the members.
Figure 12:
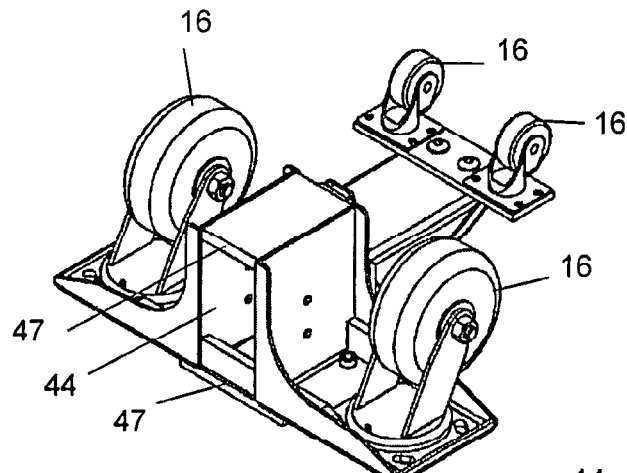
FIG. 12 is a bottom view of the embodiment of FIG. 11.
Figure 13:
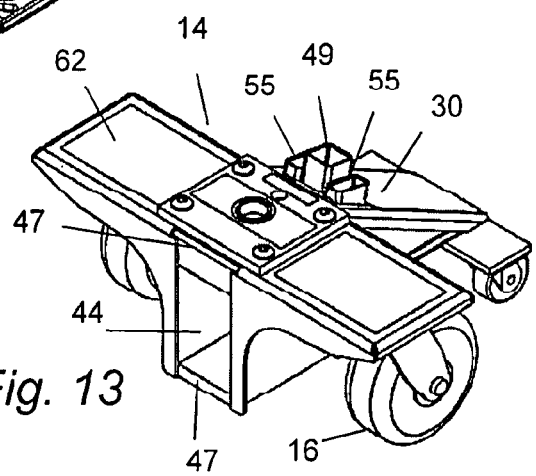
FIG. 13 depicts the device of FIG. 11 showing the slot formed in the dolly adapted for translating engagement of the lift chassis engaged to the opposing members.
Figure 14:
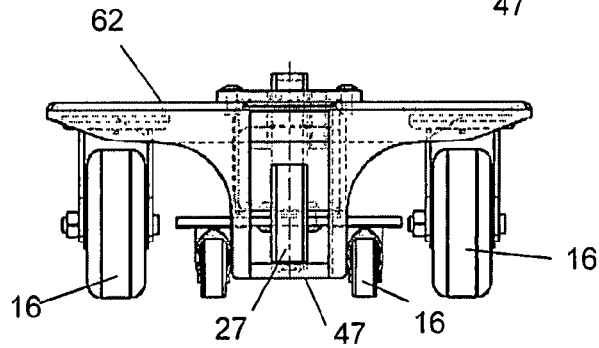
FIG. 14 depicts the device of FIG. 11 showing the elongated face projecting from the slot.
Figure 15:
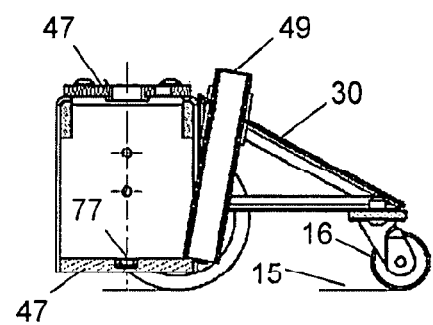
FIG. 15 is a sectional view showing the slot and the angled foot plate and handle engagement collar.
Figure 21:
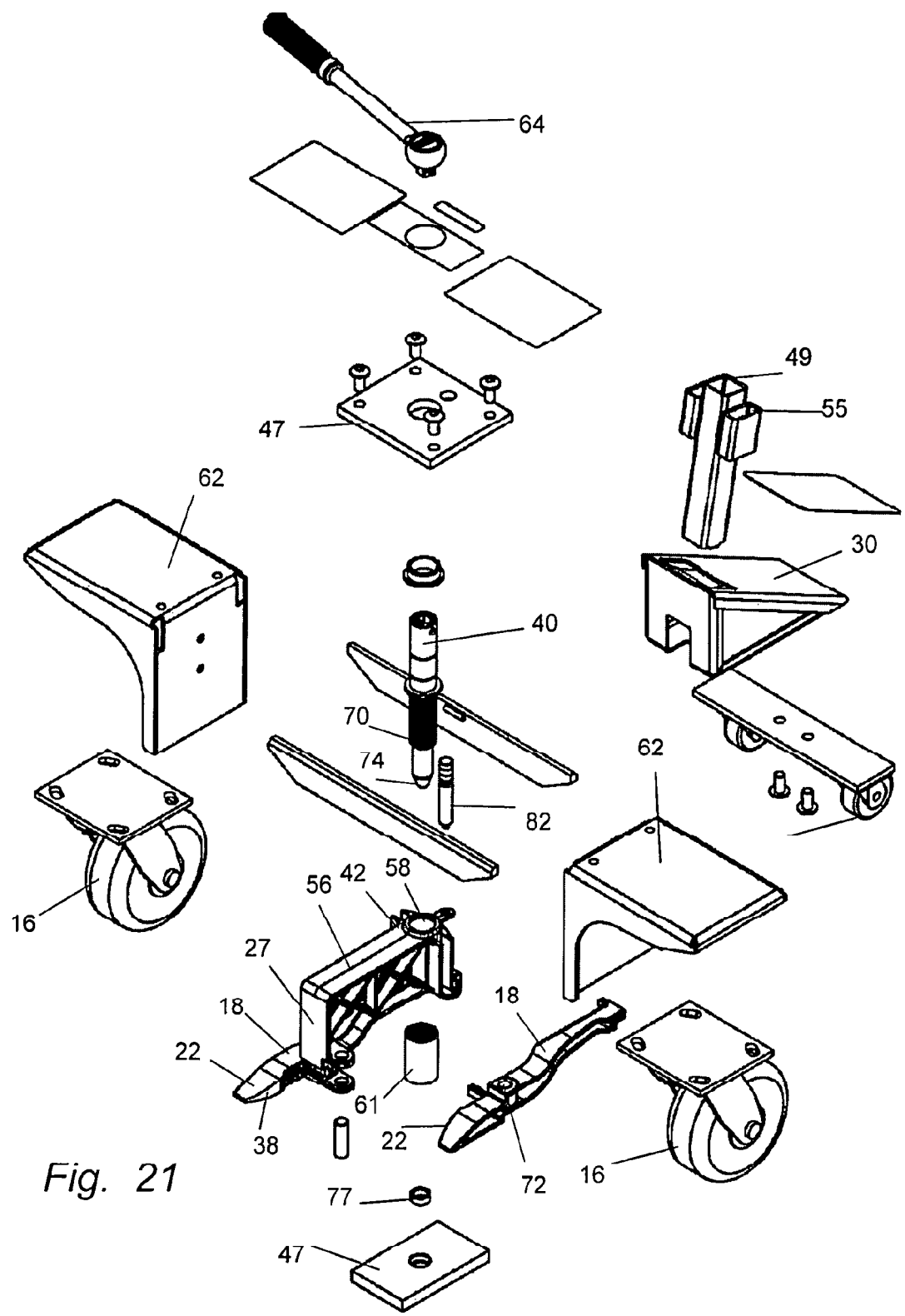
FIG. 21 shows an exploded view of the dolly device of FIG. 11.
Figure 22:
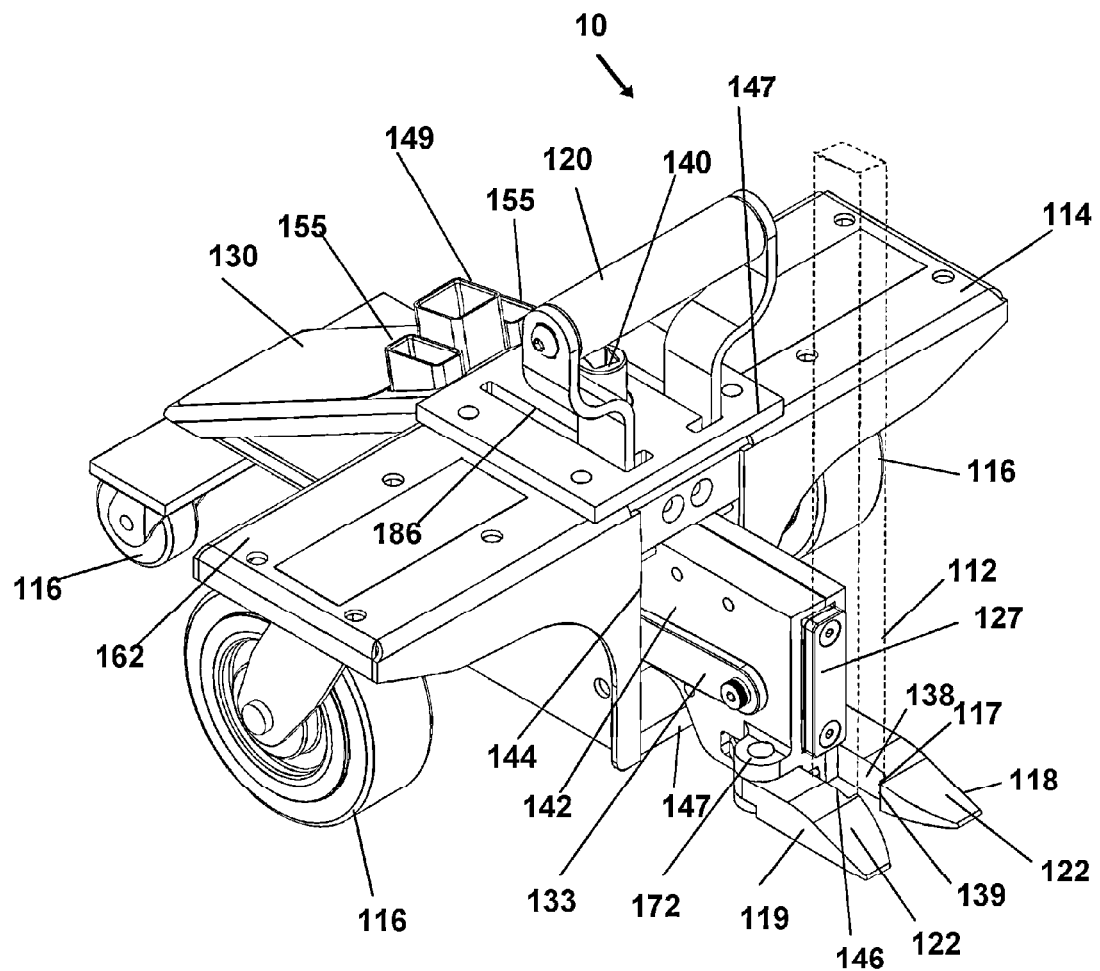
FIG. 22 depicts a perspective view of a preferred mode of the device showing the dolly from a side view while engaging a gondola or shelf and shows the opposing members adapted for a torqued engagement to the support posts.
Figure 23:
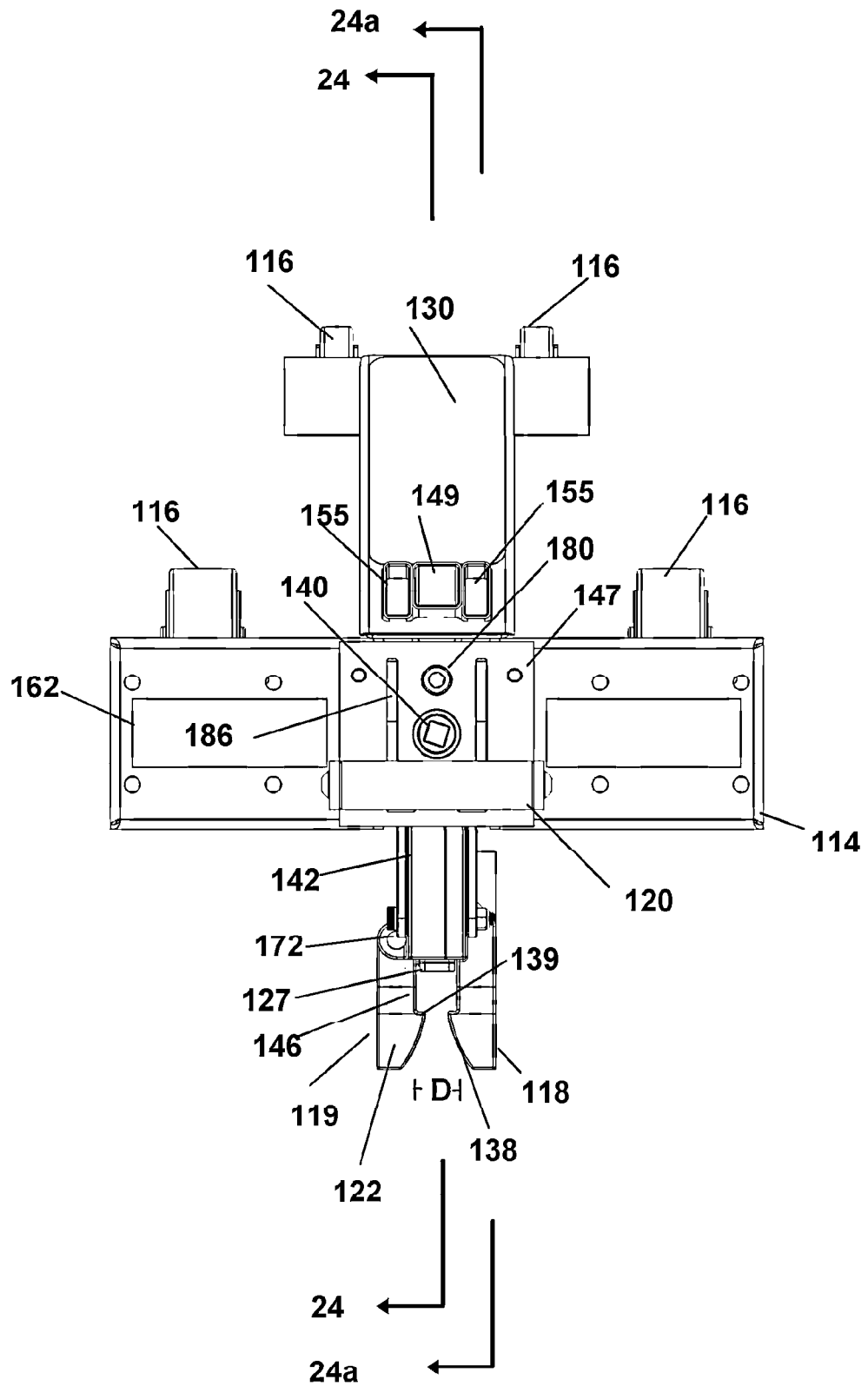
FIG. 23 is a top plan view of the device showing the adjustment screw and collar engagements for a handle and for support members that engage adjacent dollies.

As noted, FIGS. 11-20 depict an especially preferred mode of the device 10 which provides all features in a single unit. In operation, the device 10 in the mode depicted in FIGS. 11-20 is especially preferred in that all important functions providing increased utility are passively provided in a single unit which also provides means for concurrent imparting of both foot and hand force to the dolly 14 without the need for a separate setting component. As shown in FIG. 11 the single unit mode of the device 10 provides the dolly 14 having the opposing members 18 extending from one side edge and an angled footplate 30 extending to an engagement with wheels 16 at a distal end of the footplate 30 on the opposite side edge. A recess provides the collar 49 adapted for engagement to the handle 48 to provide means for the user to impart a hand force toward the shelf using a foot engaged to the footplate 30 and one or more hands on the handle 48 concurrently. This allows for increased forward force when pushing the opposing members 18 under a kickplate 13.

A slot 44 formed in the dolly 14 in between two horizontal cross members 47, provides a cavity for translating engagement of the lift chassis 42 engaged to the support member 56 which provides the mount for the two opposing members 18. The planar elongated face 27, is provided along a substantially vertical leading edge of the support member portion 56, at an angle substantially parallel to the axis of the intended support posts 12, thereby providing a planar support to engage the support posts 12 shown in FIGS. 1 and 17.

FIGS. 16-20 of this second mode depict the components which operatively engage in the slot 44 to provide both a compressive and frictionally engaging means for gripping the support posts 12 in a removable engagement, and a means for elevating the opposing members 18 above the floor 15 when so engaged to the post 12 to thereby elevate the shelf 11. As noted this mode of the device 10 also has passive means for maintaining the opposing members 18 engaged to the post 12 at all times when the post 12 is elevated. This means for preventing disengagement of the opposing members 18 from an elevated post is especially important when lifting heavy shelves with multiple dollies 14 since a release of a dolly could cause a toppling of the shelf 11.

As shown in FIG. 16, the lift chassis 42 is adapted for translational engagement in the slot 44. An elongated cavity 58 communicating through the lift chassis 42 has a threaded sidewall 60 provided by bushing 61 inserted therein or by forming the threaded sidewall 60 directly in the cavity 58. An elongated screw member 40 is adapted at a first end communicating above the top surface 62 of the dolly 14 for engagement with a wrench or other tool 64. An annular projection 66 extending from the exterior circumference of the screw member 40, maintains it above a limiting seat 68 on a top surface of the lift chassis 42 and below the top surface 62 of the dolly 14. The taper 74 on the end of the screw member 40 rides in a bearing 77 in the surface of the lower of the two cross members 47 as shown in FIG. 17. Mating threads 70 formed along the exterior surface of the screw member 40 are adapted to engage with the threaded sidewall 60.

As can be readily understood by those skilled in the art, rotation of the screw member 40 will rotate the threads 70 which are engaged with the threads in the sidewall 60. Since taper 74 engaged in the bearing 77 maintains the screw member 40 substantially stationary, its rotation will cause the lift chassis 42, and engaged support member 56, and operatively connected members 18, to translate toward and away from the floor 15 or other support surface. The annular projection 66 serves as a means for limiting vertical travel away from the floor 15. Means for rotational engagement of the connected members 18 in a scissor-like fashion, is provided by pin 72 which allows for rotation of the distal ends 23 of the members 23, to move closer when the opposite first ends of the members 18 are moved apart.

As noted, at the second end, opposite the first end of the screw member 40 is formed a taper 74 in the exterior surface 76. In addition to riding in the bearing 77 this taper is adapted in length and slant to contact one of the members 18 along a contact point 78 as a means for progressively urging that member 18 away from the lift chassis 42 thereby causing the distal ends 18 of the members 18 to approach each other. When the lift chassis 42 has been translated to its closest point to the floor 15, the contact point 78 will be moved to a position where it is closest to the center axis of the screw member 40 and thereby allowing the distal ends 23 of the members 18 to open to a released position which is a distance wider than "D" to allow the tapered edges 38 to travers past the width of the support post 12. Once the aperture 46 is situated properly, this taper 74 thereafter provides a progressive means for urging the distal ends 23 of the moving member 18 toward each other between the released position, to the engaged position shown in FIGS. 18 and 20 where the support post 12 is engaged between the members along two sides of the aperture 46 and around two corners of the support post 12 opposite the face 27. In the released position, shown in FIG. 19 the contact point 78 can move closer to the center axis 81 of the screw member 40 thereby allowing the distal ends of the members 18 to rotate and open a distance wider than that of the support post 12 "D" shown in FIG. 18. This tapered engagement of the contact point 78 to the taper 74 thereby provides a passive means for allowing spreading of the opposing members 18 during engagement to the support post 12 as the tapered top surfaces 22 are forced under the kickplate 13 and the tapered inner edges 38 are forced around the support post 12.

As noted, this allows positioning of the aperture 46 around the support post 12 properly prior to rotating the screw member 40. Thereafter with the aperture 46 surrounding the base of the support post 12, a closing arm 75 engaged to one of the members 18 will naturally close the aperture 46 when the surface of the closing arm 75 is urged against the base of the support post 12. This occurs since the end of the member 18 with the contact point 18 will freely rotate away from the taper 74 when a force is applied to the distal ends of the members 18 by the arm 75.

Once properly positioned, the user employing the tool in a first step, rotates the screw member 40. As the lift chassis 42 rises, the contact point 78 on the taper 74 progressively urges that member 18 away from the center axis 81 and thereby provides a sufficient time duration for the distal ends 23 of the opposing members 18, to rise a distance above the floor 15, and past the any extension or adjustment foot, before the inner face 38 of the members 18 at the aperture 46 engage with the exterior of the support post 12 at a second vertical position above the floor 15. It is most important to achieve this engagement in a good compressive and frictional engagement of each aperture 46 of each device 10, in the plurality employed to lift a shelf 11, at substantially the same second vertical position to keep the raised shelf 11 level, and to insure a good engagement past any extension adjustment feet. Since all of the dollies so employed would have the same taper 74 slant and taper distance, all will inherently achieve their respective engagement with a respective support post 12, at a second vertical position substantially the same distance from the floor 15. This as noted insures that the shelf 11 is lifted and maintained in a level position and that the shelf is not distorted by uneven stresses.

Once the engagement of the members 18 is achieved at the second vertical position, continued rotation of the screw member 40 will cause the threads 70 to urge the lift chassis 42 to a third vertical position, wherein the top of the lift chassis 42 contacts one or both the projection 66 and the top surface 62 thereby providing a contact for a stop. Such a contact provides a means for limiting translation of the lift chassis 42 and thereby, the distance the support post 12 is elevated. Again, since all of the dollies 14 have similarly configured screw members 40, all will limit translation away from the floor 15 at substantially the same third vertical position shown in FIG. 17, this means for limiting translation thereby insures that each support post 12 is elevated substantially the same distance from the floor 15.

Additionally, since the contact point 78 of the moving member 18 is maintained against the exterior surface 76 of the screw member 40 above the taper 74 whenever the support post 12 is elevated above the floor and until it is lowered by reverse rotation of the screw member 40, a means for preventing the release of the opposing members 18 from releasing the engagement to the support post 12 while in an elevated position is provided that is passive and automatic. Only when reverse rotation of the screw member 40 is provided for sufficient time to move the contact point 78 onto the taper 74 will the compressed frictional engagement to the post 12 be released. This greatly enhances safety as can be ascertained.

Finally, utility of the device 10 is enhanced by a visual positioning gauge 80 which in the current preferred mode of the device 10 is provided by a rod 82 having indicia 84 located thereon which may be visually compared to location indicia 86 positioned on the screw member 40 in positions above the top surface 62. Using the indicia 84 on the rod 82 relative to the location indicia 86, the user while rotating the screw member 40 can ascertain the relative positions of the distal ends of the members 18 and aperture 46 between the first position adjacent to the floor 15 and at the second vertical position and third vertical position. When properly pre calibrated, the indica on both components will align at the second vertical position and third vertical position to let the user know they have rotated the screw member 40 to reach these stages and to cease such rotation.

Referring now to the drawings of FIGS. 22-32, the modes of the device 10 and method therein disclosed operate to provide engagement to a shelf as the device of FIG. 1, however as shown the modes of the device feature an easy to use non compressive system to engage support posts 112 of conventional gondolas which extend between the bottom shelf 111 and the floor.

In the current preferred manner disclosed, the dolly 114 employ a novel means for removably engaging with the support post 112 in an operational attachment, without the need to compress jaws upon the surfaces of support post 112, with such compressive force to prevent sliding due to the weight carried by an elevated post 112, as was in previous modes. In accordance with at least one preferred mode shown, the device 10 currently employs opposing gripping members comprised of a first jaw 118 rotatably engaged with a second jaw 119 to form a slot sized to engage against the post 112 on opposing side surfaces of the post 112 using at a rotating movement to collapse and form the aperture.

Instead of a highly compressive frictional engagement against the exterior surfaces of the post 112 which can actually crush the post, or cause problems if the post 112 is not square, or bent, or has been painted, or is out of square for other reasons, the device 10 herein achieves what is termed a torqued 117 engagement which is achieved by the opposing forces generated by components to opposite sides of the post 112 and a rotation of the device 10, off its rear wheel, during movement achieving a surface contact with opposing side surfaces of the post 112.

This opposing contact with opposite side surfaces of the post 112 causes an overturning moment so to speak, of the support post 112. This overturning moment occurs when the surfaces of the post 112 are contacted in a first contact by one side surface at the first or front face 139 and in a second contact on the opposite or opposing side surface of the support post 112, at an elevation above the support surface higher than the first contact, by an opposing or elongated face 127 portion. A translation of the rotationally engaged handle 120, in a direction toward the post 112, imparts a force to translate an engaged member having the elongated face 127, toward the front face 139 but at an elevation higher, relative to the support surface or ground 115.

The translating force of the elongated face 127 against the front surface 121 of the post 112, and concurrent force of the front face 139 against the rear surface 129 of the post 112, even where neither initially contacts the surfaces of the post, causes a deflection or rotation or overturning moment of the axis A' of the post 112, relative to the axis A of the passage running through the center of the aperture 146 formed in-between the two lifting members 118 and 119.

This aperture 146 is formed such that the distance between the front face 139 of the aperture 146 and the opposing rear surface 129 of the aperture 146 is larger or substantially equal to the distance between the adjacently placed opposing wall surfaces of an inserted post 112. So inserted into the aperture 146, a translation of the handle toward the post 112 moves the elongated face 127 to contact the post and causes the front face 139 to be positioned in a contact, against the rear surface 129. During translation of the handle and contact of elongated face 127 and rear surface 129, a slight deflection or rotation occurs in the substantially vertical axis of the post 112 and the axis running through the aperture, resulting in an overhang of the front face 139 above the contact point between the front face 139 and the rear surface 129 of the aperture which bears the weight of the post 112 when elevated.

Figure 25:
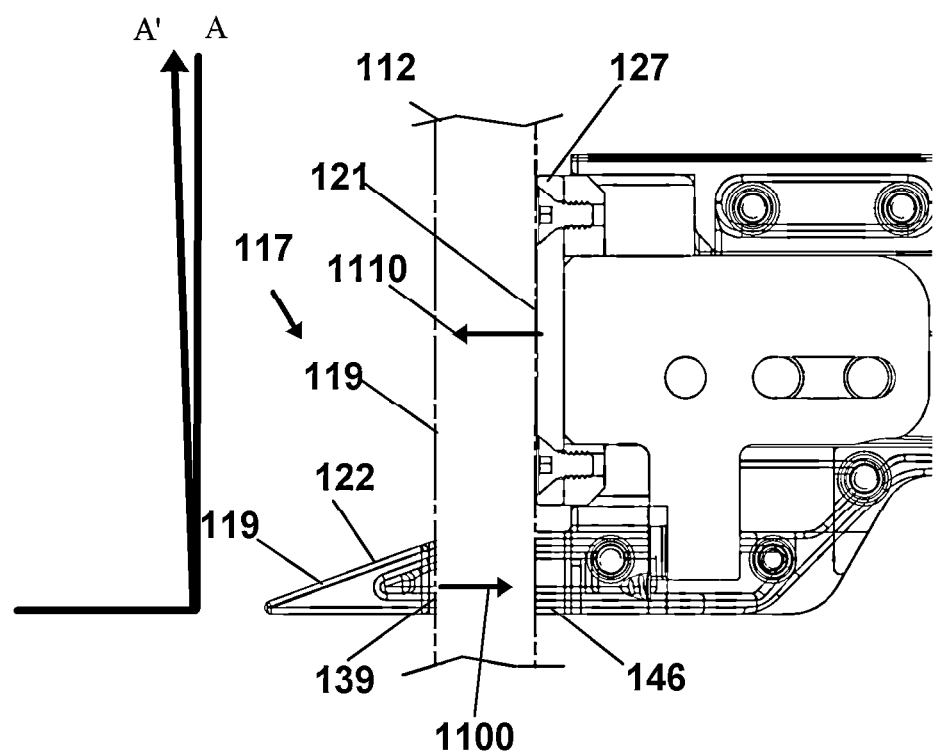
FIG. 25 shows a side view showing the slight angle of the overturn moment provided the torqued or wedged engagement of the support post with the device, and an illustration of the slight angle deflection.

This deflection or rotation slightly mis-aligns the axis A' of the support post 112 with the axis A running through the center of the passage defining the aperture 146. This misalignment yielding the overhang is shown in FIG. 25 and serves to achieve a contact which is a torqued engagement of the wall of the passage leading from the aperture 146 on opposing sides, with the opposing side surfaces of the post. Weight of the gondola when raised, increases the force at the contact point and overhang and serves to improve the removable engagement of the post 112 with the device 10 provided by the contact and overhang.

It is this engagement provided by the deflection or overhang caused by the overturning moment, from opposing forces at two different elevations, which enables the device to engage with, form a contact point, and then lift the support post 112 from the ground 115 when the closed opposing members 118, are translated upward and away from the support surface, by a means for elevating the engaged post such as an onboard jack.

As shown in FIG. 25, the torqued 117 engagement is achieved by translation of the handle to impart a forward thrust of the elongated face 127 to contact the surface of the post 112, while a lower portion of the post 112 is already communicating in a contact on an opposite side through the passage from the aperture 146 formed between the closed lifting the members 118, 119.

A twist imparting torque which is communicated against opposing front and rear surfaces of the post 112, shown in FIG. 25, occurs as the axis A' of the post 112 deflects out of alignment with the axis A running perpendicular to the support surface or floor 115 through the aperture 146. A torqued 117 engagement is provided at the contact of the opposite exterior surfaces of the post 112 at different elevations on the post 112, which is unlike other modes of post engagement for lifting, where compression of opposing surfaces at the same elevation attempt to crush the post 112, or to exert pressure thereon sufficient to prevent slipping.

In a particularly preferred mode of the device 10, means for imparting a closure of the opposing members 118, 119 toward each other, to form the aperture 146 and passageway depending therethrough, and to concurrently position the elongated surface 127 against the surface of the post 112, is provided by a handle 120. The handle 120 is rotationally engaged to the device and to a substantially L-shaped L-bracket 125 (FIG. 24a) by a cross member, which is engaged to the cam pin 125 using attachments communicating through slots 186 and engages with a cam pin and slot 124 shown in FIG. 24.

The distal end of the L-bracket 125 is rotatably engaged 131 to the chassis 142 via a pin acting as an axle, other rotational means. Translating the handle 120 within the path provided by the slots 186, rotates it in its engagement 131 and its rotational engagement to a sliding cross member 133 to in turn. This translates the cross member 133 to translate forward and rotate the jaw 119 engaged thereto, to a closed position from an open position, and concurrently impart force to move the elongated surface 127 forward to a contact against the post 112. Translating the handle 120 in an opposite direction (rearward) away from the post 112, returns the jaws 119, 118 to an open position, and translates the elongated surface 127 in a rearward position to disengaged with support post 112.

In use, with the aperture 146 positioned in the inner face 138 of the opposing members 118, 119, when the opposing members are closed, yields an aperture 146 sized to cause a contact of the rear surface 129 of the post 112, against the front face 139 of the aperture 146. Additionally, the elongated face 127 concurrently contacts the opposing side surface or front surface 121 of the post 112, while there is little or minimal contact of the inner face 138 of the aperture 146 with the post 112. The material forming the elongated face 127 is preferably slightly compressive such that contact with the front surface 121 of the post 12 will slightly compress the elongated face 127 thereby exerting a biasing or rotational force of the front surface 121 of the post 112 toward the rear surface 129. This force generated results in an initial slight rotation and misalignment of the axis A of the passage, running perpendicular from the floor 115 through the aperture 146, and the axis A' of the post 112.

It is this deflection or axial misalignment of the post 112 and the aperture 146, which create an overhang and torqued 117 engagement of only the front and rear opposing surfaces of the post 112 with the upper edge of the front face 139 of the aperture 146, and the lower edge of the aperture with the front surface 121 of the post 112, or the elongate face 127 biased against the post 121 and the aperture 146 out of coaxial alignment. Further, the additional translation of the handle 120, causes an additional translation of translating member 135 to slide it and the translatable elongated face 127, toward an engagement with the post 112 for an increased biased force thereon.

As shown and described herein, a means for elevating the opposing members 118, 119, forming the aperture, and hence the support post 112 once it is engaged, is provided. Elevation is thus achievable by rotations of screw 140 which is configured for external engagement with a tool 164 through the top surface of dolly 114. To elevate the opposing members 118 and 119, and the post 112 in its torqued engagement, the screw 140 is rotated in its threaded engagement with a sliding lift chassis 142 to which at least one of the opposing members 118, 119 are engaged. Of course the opposing members 118, 119 can be removably engaged to allow differently configured members 118, 119 adapted to different sized and shaped support posts 112 to be easily attached and used with the device 10 rendering it very adaptable to any situation.

A slot 144 formed in the dolly 114 in between two horizontal cross members 147, provides a pathway for a translating engagement of the lift chassis 142 therein. The lift chassis 142 provides the mount for one or both respective first ends of the two opposing members 118, 119. Therefor vertical translation thereof results with the translation of the lift chassis away from the support surface. The planar translatable elongated face 127, is provided along a substantially vertical leading edge of the chassis 142, at an angle substantially parallel to the axis A' of the intended support posts 112, prior to the overturning movement which eliminates the coaxial positioning of the axis A' of the support post 112 and the axis A running from the floor 115 through the center of the formed aperture 146.

Translation of the elongated face 127 as noted, provides a planar support to engage and bias against a large surface area of the support posts 112 and if given room, such force will cause a rotation of the dolly on its wheels, and slight misalignment of the axis A running perpendicular to the floor 115 through the aperture 146 and the axis A' of the post 112.

As noted, this rotation of the dolly and resulting misalignment of the aperture axis A relative to the axis A' of the post 112, and causes an slight overhang of the rear surface 129 of the post 112, with the adjacent edge of the aperture 146 as depicted by the arrowed line of FIG. 25. This misalignment and overhang, provides a means for engaging the post 112 with the aperture 146 formed in the opposing members 118 and 119, with sufficient contact to prevent slipping of the post 112 through the aperture 146 as the post 112 is elevated from contact with the support surface.

Rotating the adjustment screw 140 raises the lift chassis 142 portion of the device translationally engaged in the slot 144 of the dolly 114. This translation, with the post 112 in the overhanging or torqued engagement noted, with the aperture 146, thereby raises the post 112, engaged in the aperture 146 formed between the opposing members 118, and 119. As a consequence, when the post 112 is elevated above a contact with the floor 115, the torqued or misaligned engagement through the aperture 146 provides sufficient contact force between the aperture 146 and post 112, to continuously bear the weight of the shelf 111 to be lifted at each support post 112 easily and without slipping. This misaligned axis engagement yields an improved connection between aperture and post in that it does not require massive compression of the sides of the formed aperture 146 against the walls of the post 112 and the problems noted above associated with such required force needed for a frictional engagement to bear weight.

Also provided is a means for momentarily elevating the lower edge of the kickplate 113, above the floor 115, which as noted conventionally blocks the view of, and therefor access to, the support posts 112. In one current preferred mode of the device 10 this means for deflecting or elevate the kickplate 113 or fascia component is provided by tapered top surfaces 122 which are lower or closer to the support surface at both distal ends 123 of the opposing members 118, 119, or the tool 161 in FIG. 32, and incline as the top surfaces 123 move away from the distal ends. Translation of the tapered surfaces 122 under the kickplate and toward the center of the shelf 111, provides a means for elevating the kickplate 113 above the support surface to a sufficient height to form a pathway for access of the aperture 146 and opposing members 118 and 119, to an encirclement with the support post 112 behind the fascia.

A handle 148 configured at a first end to engage a collar 149 on the dolly 114 of the device, along with a foot engageable footplate 130, provide a means for a user to impart force from their person, to the device 10 while positioned on the support surface or floor 115 during transport to and from the shelf 111, and especially during an insertion of the tapered top surfaces 122 under the kickplate. The provision of the footplate 130 is especially important to allow the user to engage the larger muscles of the leg, to impart the force of the movement of their entire body mass to the device 10 which makes it much easier to communicate sufficient force against the kickplate to deform and elevate the kickplate with the top surfaces 122. Generally the concurrent hand and foot pushing of the dolly 112 only occurs when setting the members 118 around a support post 112 and under a kickplate 113 if employed on the shelf 111.

It is preferred in all modes of the device that the aperture 146 formed in portions upon the inner face 138 of both opposing members 118, 119 be sized to allow the front face 139 surface of the aperture 146 and elongated face 127 to engage against the opposite front and rear exterior surfaces of the support post 112. This provides for a means for connection to the post 112 with the aperture 146 in a manner to support the weight of the shelf, when the respective axis are misaligned or in a torqued 117 engagement of the aperture 146 formed between the opposing members 118, 119 on the support post 112 against and opposite the elongated face 127.

The misalignment of the respective axis A' of the post 112 and that of the aperture 146 noted above caused by the opposing forces of the aperture surfaces against opposing exterior surfaces of the post 112, herein called the torqued 117 engagement, provides a much more secure mount of the device 10 with the post 112 than other devices employing highly compressive engagements between opposing members in the same plane. The engagement herein not requiring highly compressive forces against post surfaces in a full contact, is not affected by previously deformed posts 112, or painted posts 112, or crimped posts 112 which can easily become separated from the compressive force of the opposing members in the same plane if such causes loss of contact. This problem is exacerbated when the lifted shelf 111 or gondola has products thereon and is extremely heavy, since the weight of the lifted mass is all directed down the axis of the posts 112 and against the compressive force in one plane provided in conventional frictional compressive engagements.

However the preferred engagement to the support posts 112 of the device 10 herein, through the deflection or rotation imparted to the device 10 supported on a wheel or wheels, from the misalignment of the aperture 146 relative to the axis A' of the support post 112, create an overhanging or torqued engagement of the post 112 with the aperture 146, which does not require highly compressive frictional engagements with the post sides, and is thus much more secure with more weight communicated from the shelf to the post 112.

Also preferred for the most support is a translatable elongated face 127 which is surfaced to be substantially parallel to the axis A' of the support post 112 and provides a flat or even slightly angled surface to contact one side of the post 112 for biasing a section of the post 112 slightly toward the shelf 111 in an enhanced torqued 117 engagement, which rocks the dolly slightly on the wheel.

Because this torqued 117 engagement only requires contact of the front surface 139 of the aperture 146 at the distal ends of the members 118, 119, with the slightly misaligned post 112, and a contact with the elongated face 127, the distance "D" between the inner faces 138 of the members 118, 119 can be substantially equal to or just slightly larger than the width of a support post 112. A wider distance "D" is preferably provided to accommodate deformed posts 112, painted posts 112, and bent posts 112 and the like, and to make it easier to engage the two halves of the aperture 146 around the exterior circumference of the post 112.

This engagement arrangement is also preferable because the achieved engagement of post 112 and device 10 is a passive occurrence which allows for the use of less trained labor because there is virtually no chance of slippage of the engagement as occurs with conventional compressive frictional style engagements of the lifting device to the posts 112.

Engagement of the device 10 to each post 112 is as noted easily accomplished using the inward tapered leading inside edge 122 of both opposing members 118, and 119, which communicates with the engagement aperture 146 formed therebetween. When forced forward in the aforementioned fashion, the opposing members 118, 119 will slide the edge 122 against the surfaces of the post 112 which will naturally force a separation of the opposing members 118 and 119, and guide and concurrently provide a positioning of the post 112 within the aperture 146 before moving back to a neutral position once the support post 112 is encircled by the aperture 146.

Generally, single wheel casters formed from a metal or strong polymer material that will not mar the supporting surface or flooring are effective for wheels 116 for all modes of the device 10. However, where a very heavy load is to be moved, a wider caster wheel is preferred, which distributes the load over a larger wheel/floor contact surface to prevent marring the floor.

Figure 26:
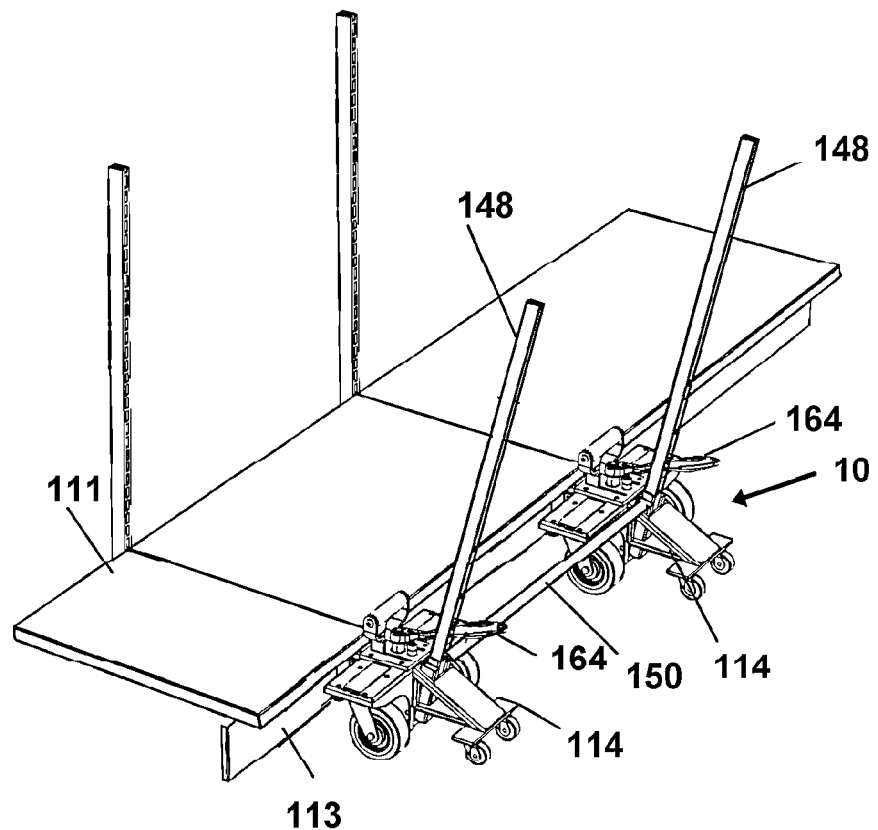
FIG. 26 shows the engagement of a plurality of the disclosed devices to a conventional shelf and the engageable support member that attaches between adjacent dollies to provide lateral support during rolling of the shelves.

Shown in FIG. 26, the dollies 114 are employed as a kit configured to be engaged to each other, and to the shelf or gondola, at multiple support posts 112 on each gondola or shelf 111 to be moved. This kit or teaming of dollies 114 and posts 112 is especially effective if the gondola or shelves are still loaded with merchandise and heavy. It has been found through experimentation that the addition of removably engageable members shown as connector bars 150, which are adapted on each respective end to form a connection between adjacent dollies 114 such as using mount 155, yield a marked increase in the stability of the devices 10 in their engagement, and the ultimate stability of the raised shelf 111.

Consequently, in particularly preferred modes of the device 10, connector bars 150 adapted at both ends to engage and removably connect adjacent dollies 114 would be employed thereby connecting all the individual dollies 114 on each side of the shelf being moved, to form a single shelf elevation unit. So engaged, the multiple dollies 114 and connector bars 150 provide a means for imparting lateral support to the base of the engaged shelf 111, and means for providing unitary movement of all the posts 112 and the plurality of shelf-engaged dollies 114 during transit of the shelf 111. Without the connector bars 150, it is highly possible that legs 112 might be bent or deform should an individual dolly 114 connected thereto become stuck or otherwise trail the movement of adjacent engaged dollies 114. The formation of shelf engagement units from dollies 114 and connector bars 150 insures such will not happen during movement of elevated shelves.

Figure 24:
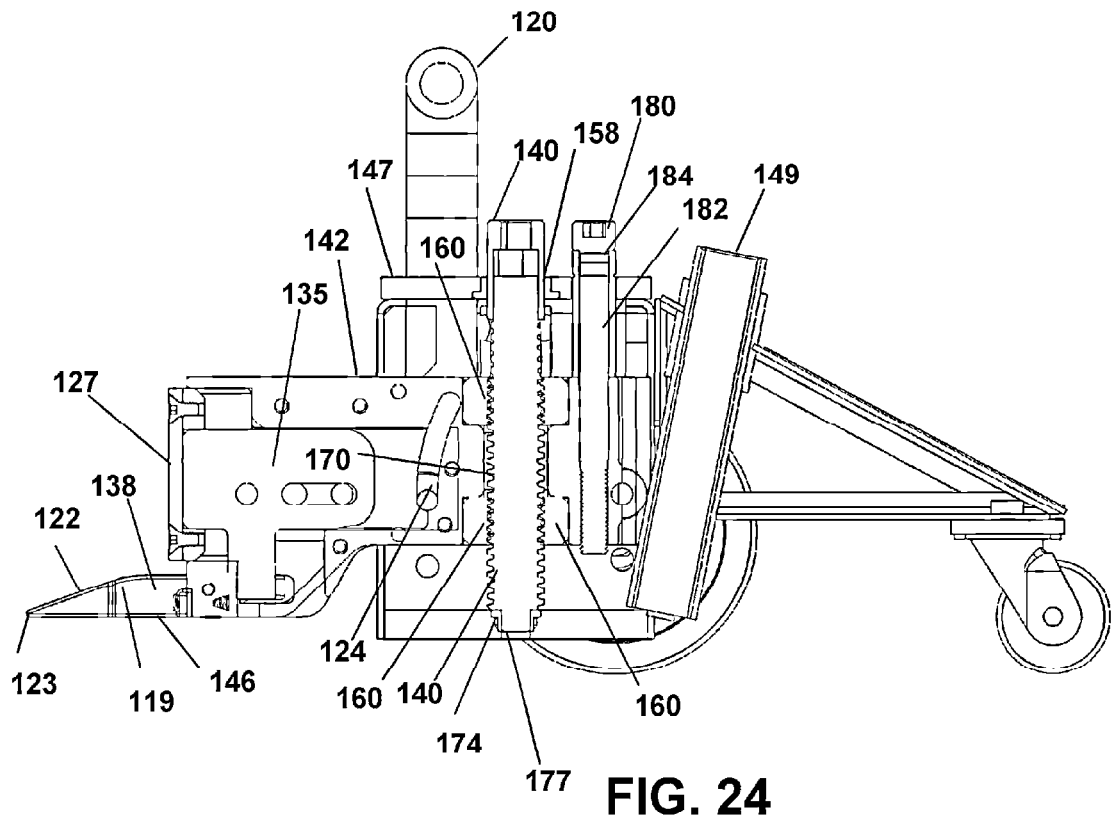
FIG. 24 depicts a sliced view along line 24-24 of FIG. 23, showing the assembled components of the device.
Figure 24A:
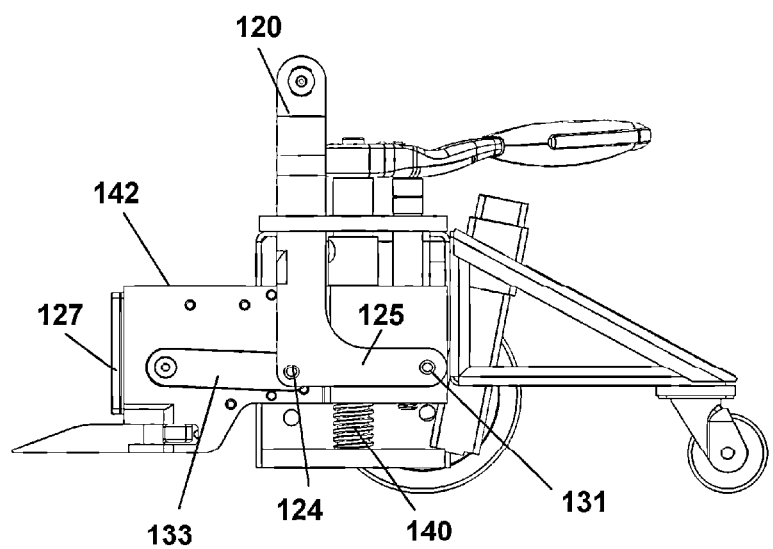
FIG. 24a depicts a sliced view along line 24a-24a of FIG. 23, showing the assembled components of the device with the handle translated forward causing translation forward of the face against the surface of a post.

FIG. 24 depict a cross sectional sliced view of the components which operatively engage in the slot 144 to provide a torqued engaging means for gripping the exterior of the support posts 112 in a removable engagement. Connected to a lifting component fo the members 118 and 119, this provides a means for elevating the opposing members 118, 119 above the support surface or floor 115 when so engaged to the post 112, and thereby elevate the shelf 111.

Figure 27:
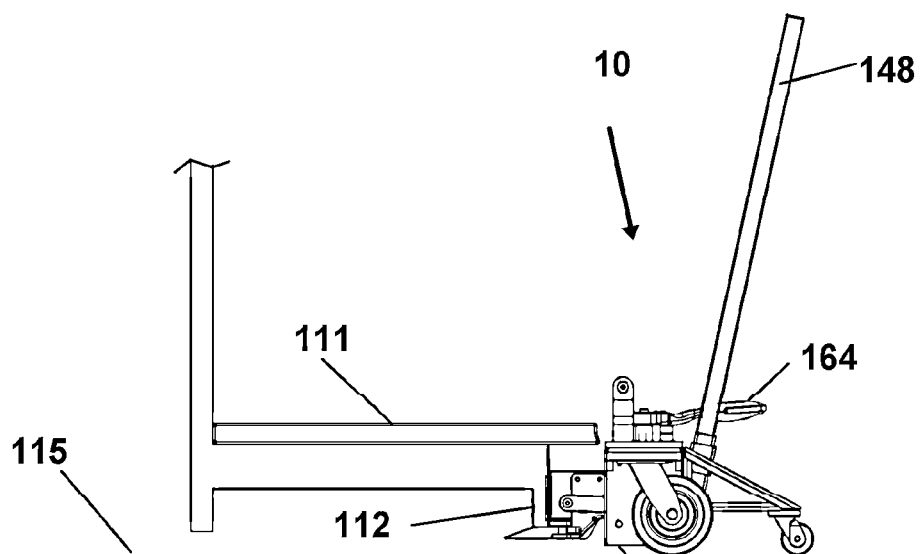
FIG. 27 depicts a side view of a device from FIG. 5, engaged around a support post of a shelf or gondola.

As noted this mode of the device 10 also has passive means for maintaining the opposing members 118 engaged to the post 112 at all times when the post 112 is elevated, shown in FIG. 27. This means for preventing disengagement of the opposing members 118, 119 from an elevated post is especially important when lifting very heavy shelves with multiple dollies 114 since a release of a dolly could cause a toppling of the shelf 111.

The lift chassis 142 is adapted for translational engagement in the slot 144. An elongated cavity 158 communicating through the lift chassis 142 has threaded sidewall portions 160 provided by a bushing inserted therein or by forming the threaded sidewall 160 directly in the cavity 158. An elongated screw member 140 is adapted at a first end communicating above the top surface 162 of the dolly 114 for engagement with a wrench or other tool 164. The taper 174 on the end of the screw member 140 rides in a bearing 177 in the surface of the lower of the two cross members 147. Mating threads 710 formed along the exterior surface of the screw member 140 are adapted to engage with the threaded sidewall portions 160.

As can be readily understood by those skilled in the art, rotation of the screw member 140 will rotate the worm like threads 170 which are engaged with mating threads in the sidewall 160. Since taper 174 engaged in the bearing 177 maintains the screw member 140 substantially stationary, its rotation will cause the lift chassis 142, and operatively connected members 118, 119, to translate toward and away from the support surface or floor 115. Additionally, means for a rotational engagement of the rotational engaged member 119 in a scissor-like fashion, is provided by pin 172 which allows for rotation of the distal end of the member 119 when the handle 120 is manipulated.

In used during engagement of a post 112, once properly positioned with the two halves of the aperture 146 surrounding the post 112, the handle 120 is urged forward to rotate the rotatably engaged member 119 forming a jaw with the other member 118, to a closed position from an open position. Concurrently, movement of the handle 120 toward the post 112 causes the translation of the elongated face 127 towards and against the exterior surface of post 112, and the force imparted higher than the force to the rear surface imparts the slight misalignment yielding the torqued engagement 117 with the aperture 146 (FIG. 25).

Again, when closed to a collapsed position, the aperture 146 is sized to engage around the post 112 with the central axis A of the aperture 146 coaxially aligned with the post axis A' initially. The front face 139 of the aperture 146 imposing a force 1100 on the rear surface 119 of the post 112 and the elongated face 127 imposing an opposing force 1110 on the opposing front surface 121 of the post 112, above the front face 139 in elevation, provides a means for mis-aligning the post axis A' and the aperture axis A, and achieves the slight overhang and the torqued engagement 117 between the post 112 and aperture 146. Again, there can be little or minimal contact of the inner face 138 defining the aperture 146 with the exterior surfaces of the post 12 and minimal or no compression thereon.

Further, the user employing the tool in a first step, can rotate the screw member 140 causing the chassis 142 to move away from the support surface, thus raising the opposing members 118, 119 and thereby elevating the support post 112 above its contact with the support surface. Utility of the device 10 is enhanced by a visual positioning gauge 180 which in one current preferred mode of the device 10 which is provided by a rod 182 having indicia 184 located thereon. In use, the user while rotating the screw member 140 can ascertain the relative vertical positions of the distal ends of the members 118 and 119, and aperture 146 by viewing the vertical position of the indicia 184 on the rod 182. When properly pre-calibrated to the size of the posts 112 to be elevated, the indica 184 may align with operative vertical positions needed for transporting the shelf and will let the user know they have rotated the screw member 140 to reach these stages and to cease such rotation.

Figure 28:
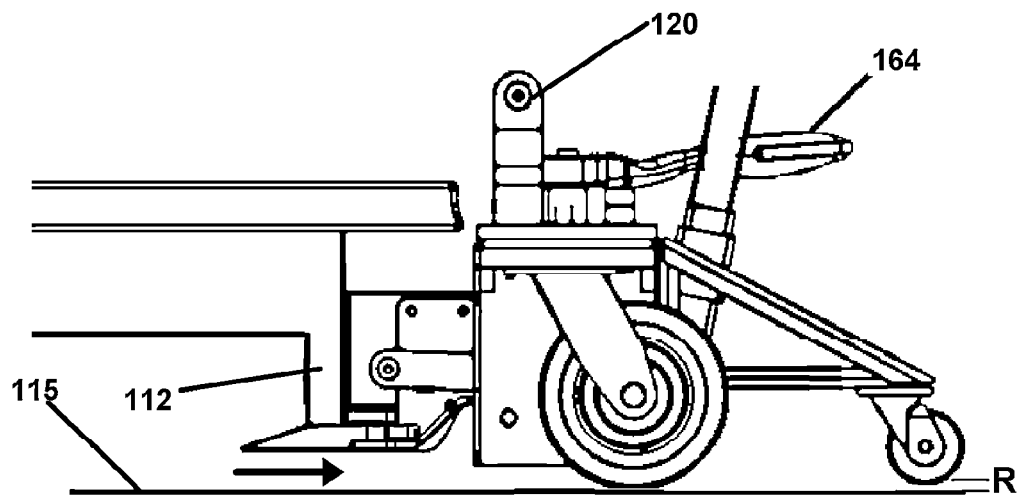
FIG. 28 depicts the device in its as-used position engaged to a gondola support member and showing the third wheel elevated a distance R above the support surface due to the rotation of the device from the overturning moment with the support member of the gondola.

FIG. 28 depicts the device 10 in its as-used position engaged to a gondola support member and showing the third wheel, elevated a distance R, above the support surface provided by the floor 115. Rotation of the axis A running through the aperture 146 from the floor 115 and the axis A' of the support post 112, to achieve the torqued engagement, is achieved by this slight initial misalignment and subsequent wheel elevation, and without the need for compressive jaws of previous modes of the device which slip under heavy weight.

Figure 29:
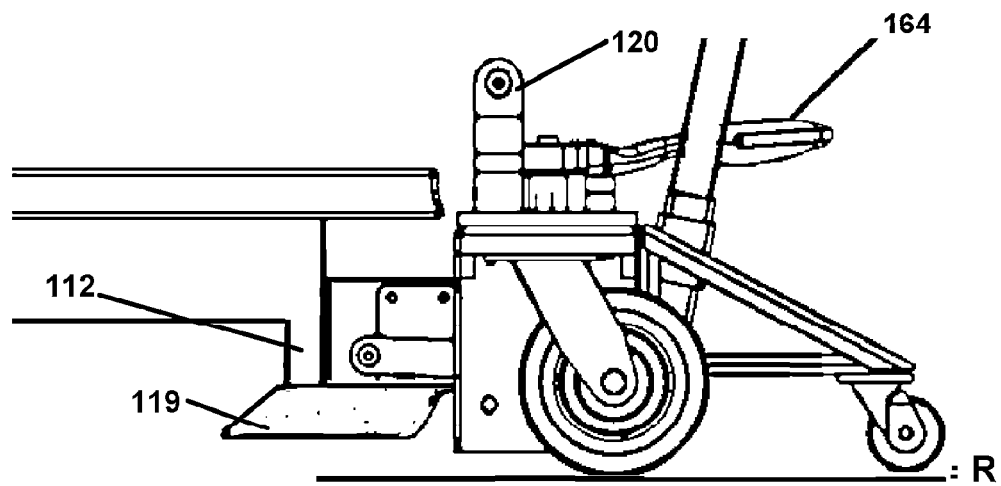
FIG. 29 depicts the device of FIG. 7, with a significantly increased depth distance of the opposing members thereby yielding an increased length of the formed passage therethrough and more secure engagement.

FIG. 29 depicts the device of FIG. 28, with a significantly increased depth distance of the opposing members 118 and 119, thereby yielding an increased length of the sidewalls communicating with the aperture 146. This increased surface area combined with the gnarled, or threaded, or other friction enhancing surfacing 161 shown in FIG. 31, provide an excellent enhancement to the aforementioned non compressive or torqued engagement.

FIG. 30 shows a sectional view horizontally through the depiction of the engagement of the member 112 in its forced slight axis misalignment through the aperture 146 of FIG. 29.

FIG. 31 depicts a sectional view along line 10-10 of FIG. 30, showing gnarling or formed teeth in the sidewall of the opposing members of FIG. 30 which when employed with an aperture 46 sized to contact the exterior of the post exterior, significantly increases the grip of the device when in the engaged mode.

FIG. 32 shows a kickplate deflector 161 which may be employed with the device of FIG. 29 where the increased depth of the opposing members renders them less than efficient in sliding under the kick plate board extending between the bottom of the gondola and the floor.

Figure 33:
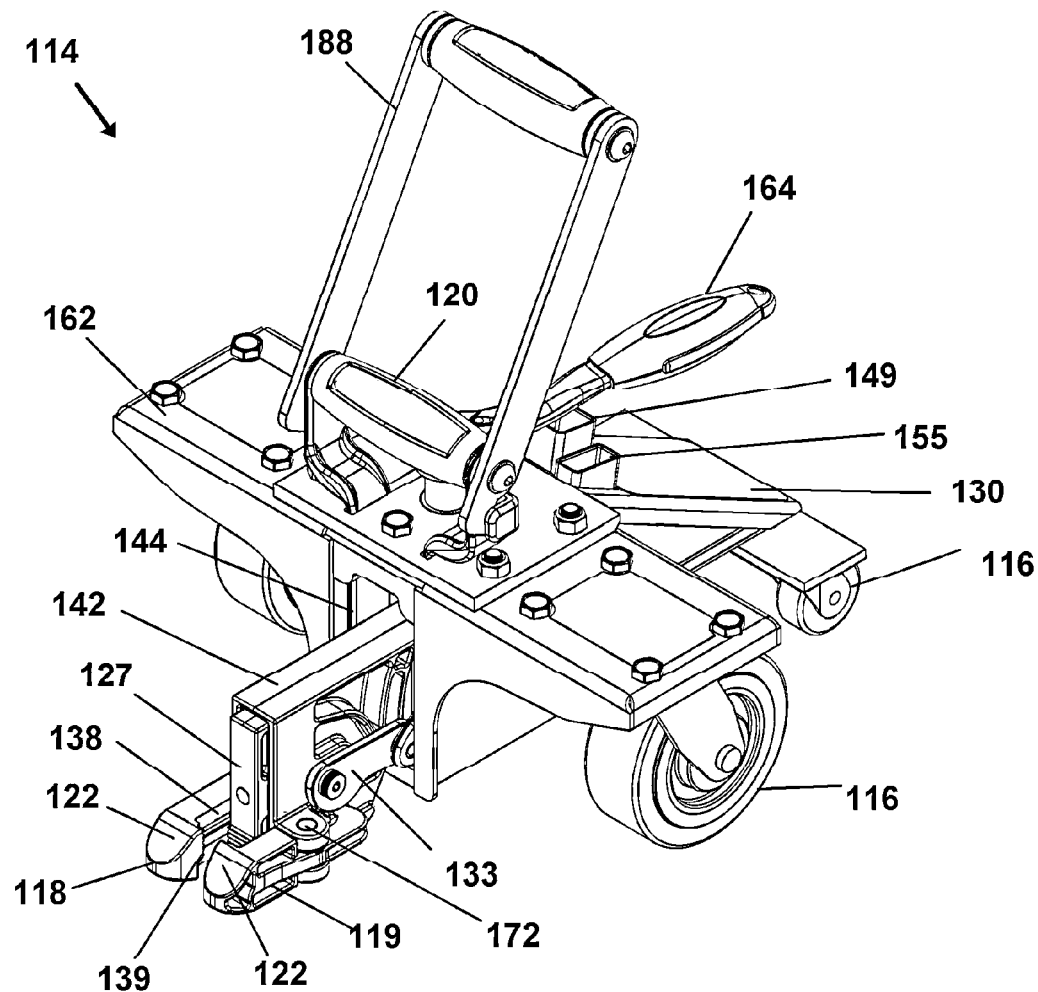
FIG. 33 shows a view of another mode of the dolly employing non-compressive engagement means to a gondola support post and having an elongated leverage enhancing clamping handle.
Figure 34:
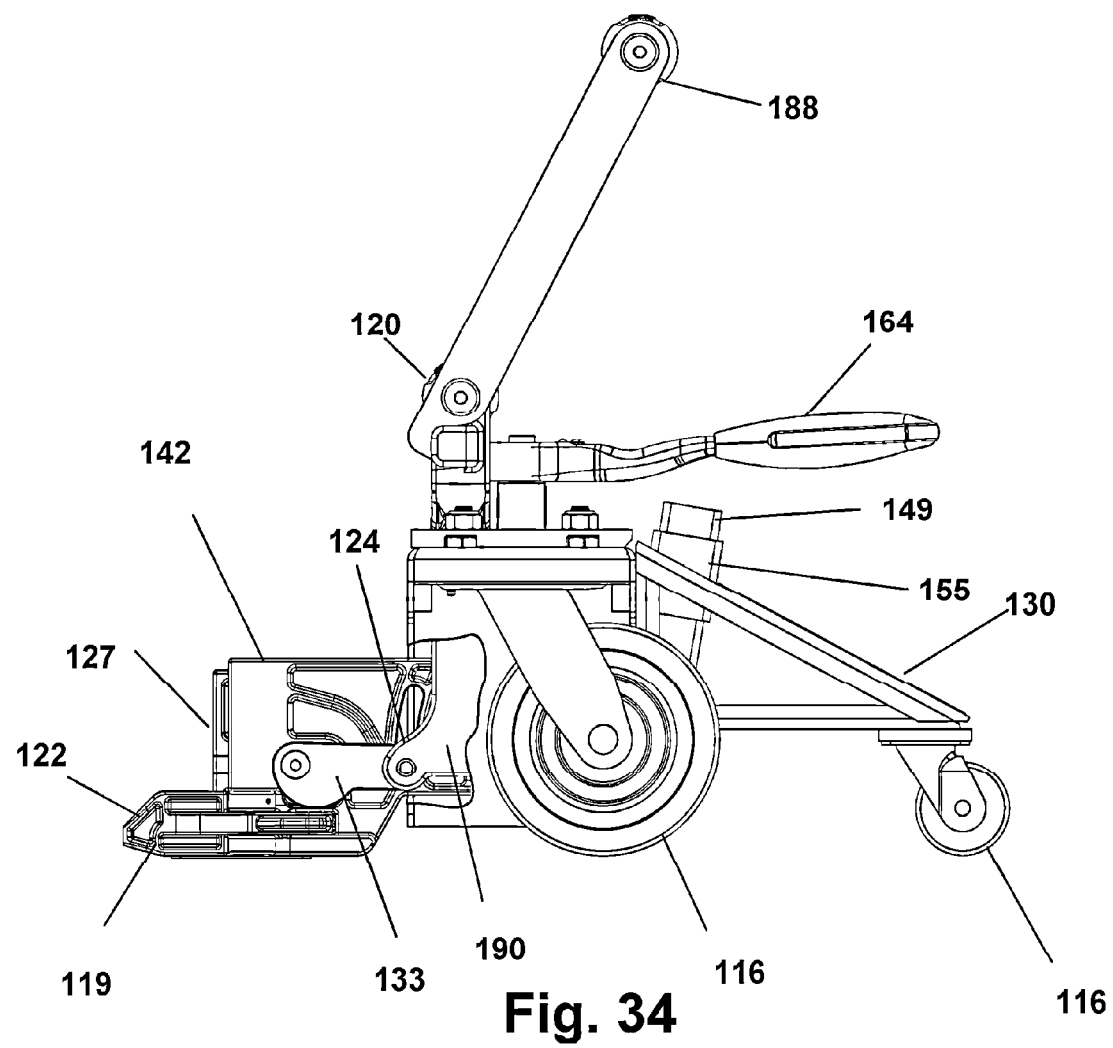
FIG. 34 shows a side view of the mode of the dolly of FIG. 33.

FIG. 33 an 34 shows views of yet another particularly preferred mode of the dolly 114 of the present invention. This mode is similar to the mode shown previously in FIGS. 22-24, having similar components denoted by similar reference numerals. However, a notable difference with the current mode of the dolly 114 is the employment of an elongated leverage enhancing clamping handle 188 which is rotatably engaged to the translating handle 120.

Firstly, it is noted that during operative employment of the dolly 114, when clamping the jaws, 118, 119 around a post 112 or other member, a considerable amount of force is required by the user to translate the handle 120 forward, translating the sliding member 133 forward, and thereby imparting a closure of the rotatable jaw 119. The elongate handle 188 is essentially an elongated torque arm providing a means for aiding the user to slide the handle 120 forward. In addition, the rotatable engagement of the elongated handle 188 allows the handle 188 to be folded flat as needed for storage or transportation or when not in use. A handle 188 from 6 to 18 inches long may be employed depending on the amount of force required.

In the current mode, the force for closing the jaw 119 may be further increased by forming the pin and slot engagement 124 communicating between the handle linkage 190 and sliding member 133, to provide an over-center safety locked engagement when the handle 120 is in the forward most locked position. The over-center safety locking means may be provided by configuring the pin and slot 124 to achieve a 2 degree over-center forward position, for example. However it is noted that other means for a locked engagement of the handle 120 in the forward position may be employed and are anticipated however the employed over-center locking means is passive and need not be remembered to be set by the user which is preferred. This safety feature is preferred as it will ensure the jaws 118, 119 do not inadvertently disengage while in use and potentially holding a very heavy load. Using a passive over-center lock insures the engagement is automatically locked, and unlocked when the handle is rotated.

FIG. 35-38 show views of a lifter bar 192 in accordance with at least one preferred mode of the invention. The lifter bar 192 is employed for lifting display structures, cases, or gondolas which have support posts 112, which may be unreachable through conventional employment of the dolly 114. Further, the lifter bars 192 can be employed if it is desired not to engage directly to the support posts 112 for any reason.

The lifter bar 192 comprises an elongated bar having a first end 192, second end 194, translatable leg support 202, height adjusting member 198, and a plurality of pins 200 and apertures 210 providing a means for registered engagement of a pair of opposing lifter bars 192.

In use, a pair of lifter bars 192 are opposingly positioned at the bottom of a conventional display case or gondola upright support fixture 212 as shown in FIG. 37. The lifter bars 192 are brought together such that the plurality of pins 200 align in a registered engagement with the complimentary opposing apertures 210 and are communicated under the fixture 212 between the support posts 112. The bars 192 are then securely engaged through complimentary tongue 206 and groove 204 portions formed at the respective ends 194, 194 as shown in FIG. 38. It is noted and anticipated that other suitable means for secured engagement of the lifter bars 192 may be employed.

Figure 39:
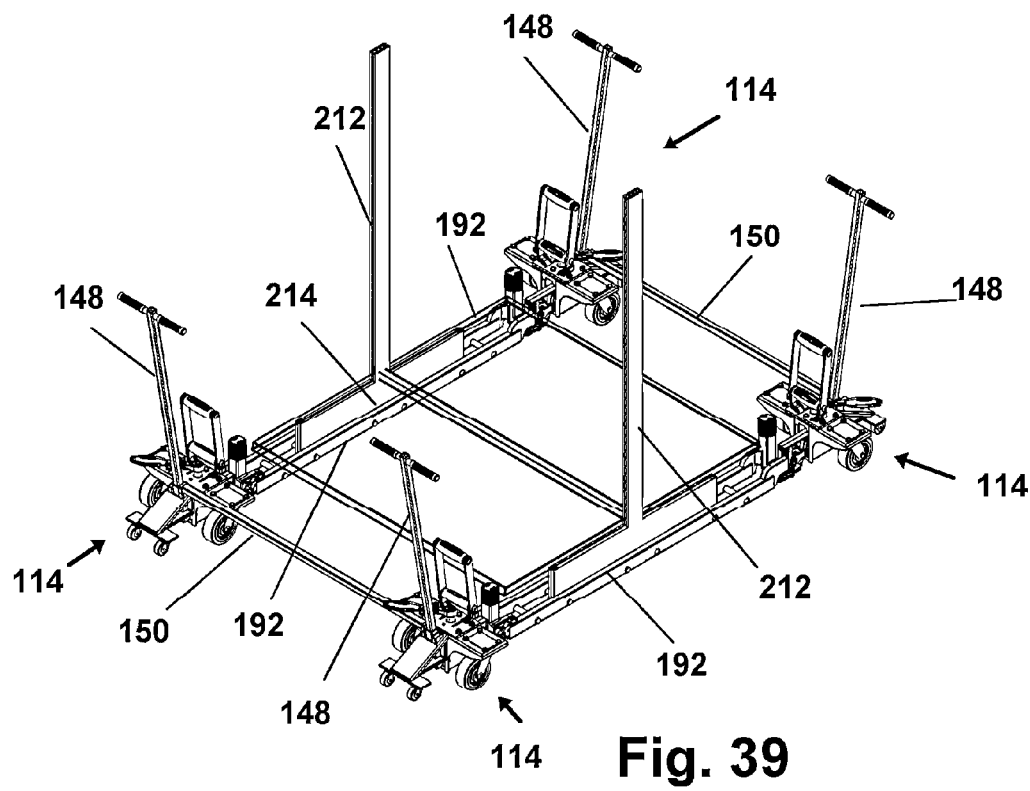
FIG. 39 shows a plurality of dollies engaging a plurality of opposing sets of lifter bars engaged to a display case.
Figure 40:
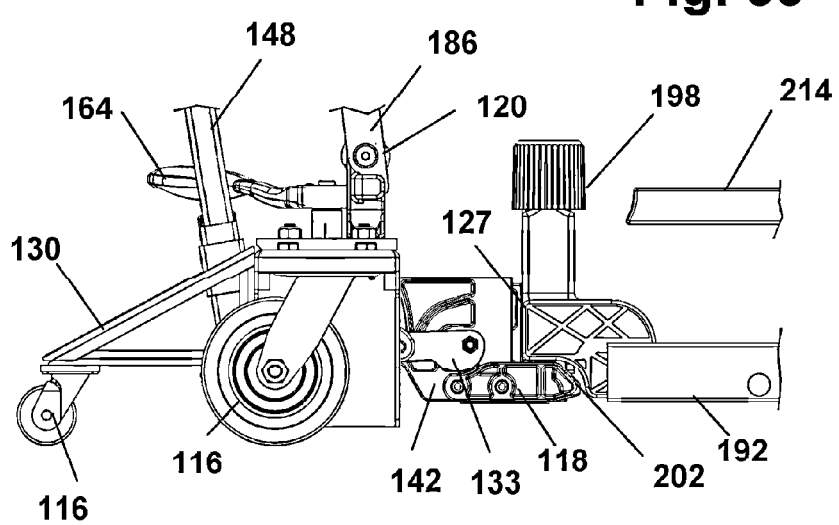
FIG. 40 shows a side view of the engagement of the dolly to the support leg of the lifting end of the lifter bar for lifting display cases which may not have readily accessible support posts.

FIG. 39 shows an example as used mode of the invention employing pairs of lifter bars 192 engaged to the fixture uprights 212 of a display case, gondola, or other structure. The shelves 214 are shown transparent for demonstrative purposes. Shown in FIG. 40, the translating leg supports 202 of the securely engaged lifter bars 192 now provide posts for engaging the jaws 119, 118 of the dolly 114. In addition, if the space between the shelf 214 and floor is quite small, or to otherwise provide a suitable engagement surface for the jaws, 118, 119, the translating legs 202 can be extended or retracted through employment of the adjustment member 198. In the current mode the adjustment member 198 is provided by a rotatable nob communicating with the leg 202, which upon a rotation of the nob will extend or retract the leg 202. This can be accomplished by a conventional translatable threaded communication of the nob to the leg 202. In other modes however, the adjustment member 198 may be provided by a permanent, or removably engageable wrench or other tool 164 as shown previously.

It is know that there exists many display case types other than conventional gondolas and shelving type structures shown in previous figures. However it is noted that the dolly 114 of the present invention is capable of employment to lift essentially any type display or storage structure known in the art, even those not having readily accessible support posts 12 as described previously. For example, conventional pallet rack support structures are one such type structure which do not have support posts 12 as defined previously which are suitable for engagement with the jaws 118, 119 of the dolly 114. However, FIG. 41a-41e show views of a particularly preferred pallet rack adapter 215, which allows the dolly 114 to be employed in such pallet rack support structures having conventional pallet rack support legs 221.

Figure 41A:
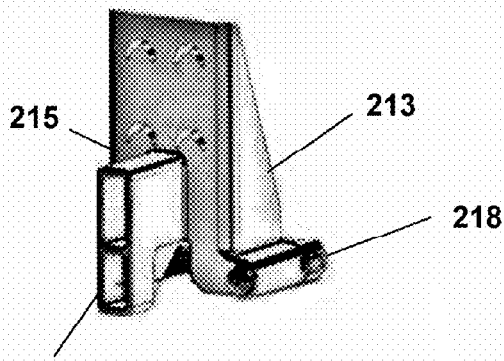
FIGS. 41a shows a front perspective view of a pallet rack adapter which provides a means for employing the dolly of the device on pallet rack structures.
Figure 41B:
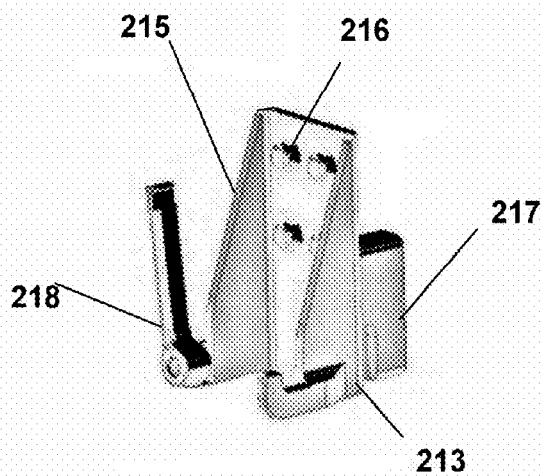
Figure 41C:
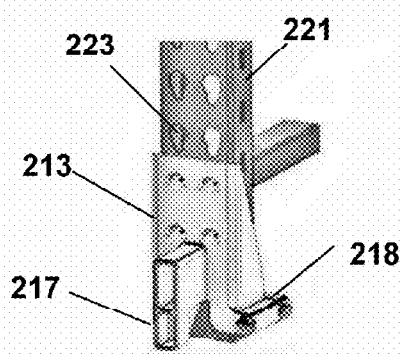
FIG. 41c shows a front perspective view of the adapter of FIG. 41a in the engaged mode to a pallet rack structure.
Figure 41D:
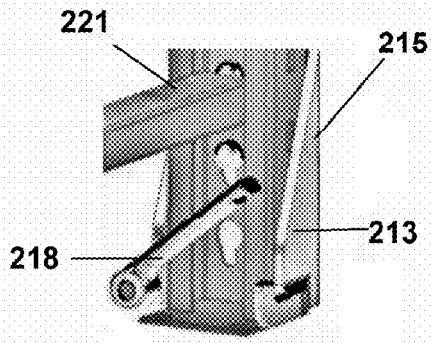
FIG. 41d shows a rear perspective view of the adapter of FIG. 41a in the engaged mode.
Figure 41E:
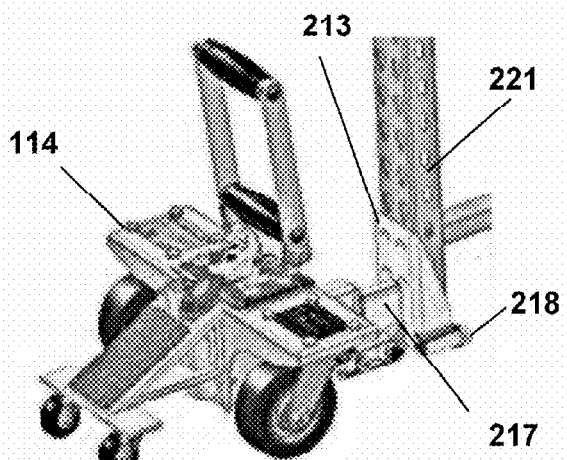
FIG. 41e shows a view the as used mode of the pallet rack adapter showing the dolly engaged thereto.

The adapter 215 comprises a support body 215 configured and adapted for an engagement to conventional pallet rack support leg 221. The support body 215 includes a plurality of engagement tabs 216 adapted to engage within conventional support leg 221 apertures 223 as shown in FIG. 41c, thereby providing a means for engaging the adapter 213 to the support leg 221. A rotatably engaged locking arm 218 is also provided as a means for securing the adapter 213 to the support leg 221 as shown in FIG. 41d. In addition, the adapter 213 includes a support post 217 which is configured for an engagement with the jaws 118,119 of the dolly 114, thereby allowing the dolly 114 of the present invention to be employed on moving conventional pallet rack support structures.

It is noted that it is within the scope and intent of the present invention to provide various other adapter configurations providing a support post which can engage to various other types of display cases which may not have conventional support posts 12 readily available which can be engaged to the jaws 119, 118 of the dolly 114. Therefor it is anticipated that those skilled in the art may recognize the plurality of other display and support structures which do not provide such a support post 12 and therefor may further recognize the need for an adapter will allow for employment of the dolly 114. Since such a wide variety of display and support structure exist, it is not within the limitations of the disclosure to provide examples of every such adapter which may be needed for suitable employment of the dolly 114, however are to be considered part of this invention.

Figure 42:
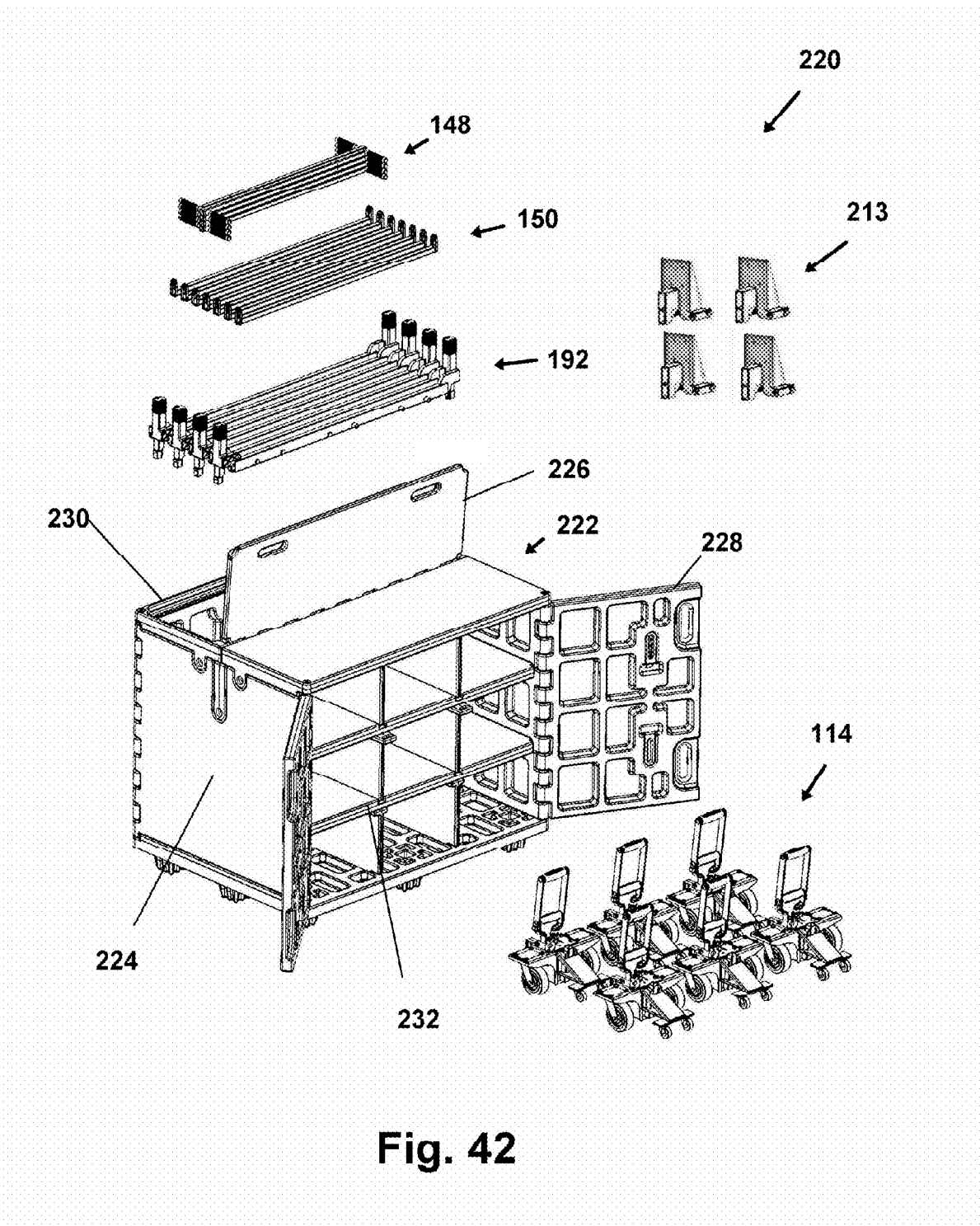
FIG. 42 shows a view of a particularly preferred kit comprising various components of the device which can be housed and stored in a shippable container.

FIG. 42 shows another particularly preferred mode of the invention showing a kit 220 which is providable to users in kit form, comprising one or a combination of a plurality of handles 148, connector bars, 150, lifter bars 192, dollies 114, adapters 213, and a container 222. Such a kit 220 could be ready provided to users such as supermarkets, warehouses, or other locations which conventionally employ display cases, gondolas, or other structures which are employable with the dolly 114.

In at least one preferred mode, the container 222 is modular structure formed of removably engageable and constructable plastic, metal, wood or other material components such as sidewalls 224, rotatably engageable lids 226, rotatably engageable doors 228, removable engageable partitions 232, and the like for forming operative compartments 230, cubbies, and the like for housing the various components of the kit 220 for transportation and storage. It is additionally preferred that the container 220 is adapted for engagement to conventional fork lifts as needed for moving the container 220 containing the kit 220.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed is:

1. An apparatus for moving display cases supported by support posts having supporting ends positioned on a support surface, comprising:
    a dolly, said dolly having a supporting member;
    said dolly supported for rolling on said support surface by at least one wheel engaged with said dolly;
    a support post gripping component having a first member and a second member;
    said first and second members extending to respective distal ends spaced from a first side of said dolly from respective first ends which are supported by a lifting chassis;
    said lifting chassis engaged to at least one of said respective first ends, said lifting chassis in a translating engagement with said dolly in a direction of translation running substantially normal to said support surface;
    said distal ends terminating at end edges, said distal ends each having a top surface, outer edge surfaces, and having respective opposing inner edge surfaces opposite said outer edge surfaces, said inner edge surfaces forming an opening therebetween;
    means to translate one of said respective inner edge surfaces from a first position with said opening in an enlarged size, toward the other of said inner edge surfaces, to a second position wherein said opening is in a collapsed size;
    said collapsed size of said opening sized for positioning a first side of said opening, adjacent to a respective first side surface of said support post;
    a facing surface positioned to contact a second side surface of said support post, opposite said first side surface;
    means for translation said facing surface toward said first side of said opening;
    said translation of said facing surface imparting a deflection of said first side surface toward said first side of said opening;
    said deflection forming an engagement between said first side of said opening and said first side surface of said support post;
    means for a translation of said lifting chassis vertically toward and away from said support surface;
    said opening in said enlarged size positionable to a first position with said support post within said opening, by rolling said dolly on said at least one wheel in a direction to place said support post within said opening;
    a translation of said lifting chassis away from said support surface with said first side of said opening in said engagement with said first side surface of said support post, providing means for raising said support post from a supported position with said supporting end of said support post resting on said support surface, to an elevated position with said supporting end of said support post elevated above said support surface; and
    whereby said support post is repositionable upon said support surface to different said supported positions, by a rolling of said dolly with said support post in said engagement.

2. The apparatus for moving display cases of claim 1 additionally comprising:
    said deflection forming an overhang of said first side surface of said support post positioned above said contact with said first side of said opening.

3. The apparatus for moving display cases of claim 2 wherein said means to translate one of said respective inner edge surfaces from a first position with said opening in an enlarged size, toward the other of said inner edge surfaces, to a second position wherein said opening is in a collapsed size, comprises:
    a handle rotationally engaged to said dolly;
    a member engaged between said handle and one of said first member and a second member; and
    rotation of said handle causing a rotation of one of said first member and said second member toward the other of said first member and said second member.

4. The apparatus for moving display cases of claim 3 wherein said means for translation said facing surface toward said first side of said opening comprises:
    said facing surface positioned at a distal end of a contact member slidably engaged with said dolly; and
    said contact member in an engagement to said handle whereby said contact member translates toward said first side of said opening during said rotation of said handle.

5. The apparatus for moving display cases of claim 3 additionally comprising:
    said top surfaces of said distal ends of said first and second members each having a taper, said taper defining a declining angled top surface extending from a first point on said top surface adjacent to said end edges, in a declining line toward said end edges; and
    said taper defining an inclining ramp, said ramp providing means to deflect a vertical kickplate positioned above said support surface and blocking access to said opening, in a direction away from said support surface, during a positioning of said opening to said first position.

6. The apparatus for moving display cases of claim 4 additionally comprising:
    said top surfaces of said distal ends of said first and second members each having a taper, said taper defining a declining angled top surface extending from a first point on said top surface adjacent to said end edges, in a declining line toward said end edges; and
    said taper defining an inclining ramp, said ramp providing means to deflect a vertical kickplate positioned above said support surface and blocking access to said opening, in a direction away from said support surface, during a positioning of said opening to said first position.

7. The apparatus for moving display cases of claim 2 additionally comprising:
said top surfaces of said distal ends of said first and second members each having a taper, said taper defining a declining angled top surface extending from a first point on said top surface adjacent to said end edges, in a declining line toward said end edges; and
said taper defining an inclining ramp, said ramp providing means to deflect a vertical kickplate positioned above said support surface and blocking access to said opening, in a direction away from said support surface, during a positioning of said opening to said first position.

8. The apparatus for moving display cases of claim 7 additionally comprising:
a portion of each said inner edge surfaces between said opening and said end edges, having a curve;
each said curve being toward a respective outer edge surface of each of said first and second members;
a declining gap formed between said curves from a widest point adjacent to said end edges to a narrowest point adjacent to said opening; and
said declining gap providing means for guiding said support post from a capture point adjacent to said end edges, to said first position within said opening.

9. The apparatus for moving display cases of claim 2 additionally comprising:
a portion of each said inner edge surfaces between said opening and said end edges, having a curve;
each said curve being toward a respective outer edge surface of each of said first and second members;
a declining gap formed between said curves from a widest point adjacent to said end edges to a narrowest point adjacent to said opening; and
said declining gap providing means for guiding said support post from a capture point adjacent to said end edges, to said first position within said opening.

10. The apparatus for moving display cases of claim 2 wherein said means for translation of said lifting chassis vertically toward and away from said support surface comprises:
a screw member having a first end adapted for engagement to a tool to rotate it, and having a second end supported on a bearing which is supported by said dolly;
said screw member engaged to said dolly with said first end exposed and positioned at an angle substantially normal to said support surface;
said screw member having threads on an exterior circumference area, said threads configured for engagement with mating threads positioned in an axial cavity communicating through said lifting chassis; and
a rotation of said screw member communicating a translation of said lifting chassis toward or away from said support surface depending on the direction of said rotation.

11. The apparatus for moving display cases of claim 1 wherein said means to translate one of said respective inner edge surfaces from a first position with said opening in an enlarged size, toward the other of said inner edge surfaces, to a second position wherein said opening is in a collapsed size, comprises:
a handle rotationally engaged to said dolly;
a member engaged between said handle and one of said first member and a second member; and
rotation of said handle causing a rotation of one of said first member and said second member toward the other of said first member and said second member.

12. The apparatus for moving display cases of claim 11 wherein said means for translation said facing surface toward said first side of said opening comprises:
said facing surface positioned at a distal end of a contact member slidably engaged with said dolly; and
said contact member in an engagement to said handle whereby said contact member translates toward said first side of said opening during said rotation of said handle.

13. The apparatus for moving display cases of claim 12 additionally comprising:
said top surfaces of said distal ends of said first and second members each having a taper, said taper defining a declining angled top surface extending from a first point on said top surface adjacent to said end edges, in a declining line toward said end edges; and
said taper defining an inclining ramp, said ramp providing means to deflect a vertical kickplate positioned above said support surface and blocking access to said opening, in a direction away from said support surface, during a positioning of said opening to said first position.

14. The apparatus for moving display cases of claim 13 wherein said means for translation of said lifting chassis vertically toward and away from said support surface comprises:
a screw member having a first end adapted for engagement to a tool to rotate it, and having a second end supported on a bearing which is supported by said dolly;
said screw member engaged to said dolly with said first end exposed and positioned at an angle substantially normal to said support surface;
said screw member having threads on an exterior circumference area, said threads configured for engagement with mating threads positioned in an axial cavity communicating through said lifting chassis; and
a rotation of said screw member communicating a translation of said lifting chassis toward or away from said support surface depending on the direction of said rotation.

15. The apparatus for moving display cases of claim 12 wherein said means for translation of said lifting chassis vertically toward and away from said support surface comprises:
a screw member having a first end adapted for engagement to a tool to rotate it, and having a second end supported on a bearing which is supported by said dolly;
said screw member engaged to said dolly with said first end exposed and positioned at an angle substantially normal to said support surface;
said screw member having threads on an exterior circumference area, said threads configured for engagement with mating threads positioned in an axial cavity communicating through said lifting chassis; and
a rotation of said screw member communicating a translation of said lifting chassis toward or away from said support surface depending on the direction of said rotation.

16. The apparatus for moving display cases of claim 11 additionally comprising:
said top surfaces of said distal ends of said first and second members each having a taper, said taper defining a declining angled top surface extending from a first point on said top surface adjacent to said end edges, in a declining line toward said end edges; and said taper defining an inclining ramp, said ramp providing means to deflect a vertical kickplate positioned above said support surface and blocking access to said opening, in a direction away from said support surface, during a positioning of said opening to said first position.

17. The apparatus for moving display cases of claim 1 additionally comprising:

said top surfaces of said distal ends of said first and second members each having a taper, said taper defining a declining angled top surface extending from a first point on said top surface adjacent to said end edges, in a declining line toward said end edges; and said taper defining an inclining ramp, said ramp providing means to deflect a vertical kickplate positioned above said support surface and blocking access to said opening, in a direction away from said support surface, during a positioning of said opening to said first position.

18. The apparatus for moving display cases of claim 17 additionally comprising:

a portion of each said inner edge surfaces between said opening and said end edges, having a curve;

each said curve being toward a respective outer edge surface of each of said first and second members;

a declining gap formed between said curves from a widest point adjacent to said end edges to a narrowest point adjacent to said opening; and said declining gap providing means for guiding said support post from a capture point adjacent to said end edges, to said first position within said opening.

19. The apparatus for moving display cases of claim 1 additionally comprising:

a portion of each said inner edge surfaces between said opening and said end edges, having a curve;

each said curve being toward a respective outer edge surface of each of said first and second members;

a declining gap formed between said curves from a widest point adjacent to said end edges to a narrowest point adjacent to said opening; and said declining gap providing means for guiding said support post from a capture point adjacent to said end edges, to said first position within said opening.

20. The apparatus for moving display cases of claim 1 wherein said means for translation of said lifting chassis vertically toward and away from said support surface comprises:

a screw member having a first end adapted for engagement to a tool to rotate it, and having a second end supported on a bearing which is supported by said dolly;

said screw member engaged to said dolly with said first end exposed and positioned at an angle substantially normal to said support surface;

said screw member having threads on an exterior circumference area, said threads configured for engagement with mating threads positioned in an axial cavity communicating through said lifting chassis; and a rotation of said screw member communicating a translation of said lifting chassis toward or away from said support surface depending on a direction of said rotation.

\* \* \* \* \*